(12) United States Patent
Eisele et al.

(10) Patent No.: US 12,065,245 B2
(45) Date of Patent: Aug. 20, 2024

(54) LAVATORY WITH EXPANDABLE DOOR

(71) Applicant: The Boeing Company, Chicago, IL (US)

(72) Inventors: Gregory T. Eisele, Everett, WA (US); James A. Fullerton, Bothell, WA (US)

(73) Assignee: The Boeing Company, Arlington, VA (US)

( * ) Notice: Subject to any disclaimer, the term of this patent is extended or adjusted under 35 U.S.C. 154(b) by 82 days.

(21) Appl. No.: 17/645,125

(22) Filed: Dec. 20, 2021

(65) Prior Publication Data

US 2022/0212774 A1 Jul. 7, 2022

Related U.S. Application Data

(60) Provisional application No. 63/134,126, filed on Jan. 5, 2021.

(51) Int. Cl.
B64D 11/02 (2006.01)
(52) U.S. Cl.
CPC ................... B64D 11/02 (2013.01)
(58) Field of Classification Search
CPC ..... B64D 11/02; B64D 11/04; B64D 11/0023; E06B 3/91; E06B 3/921; E06B 3/922; B63B 2029/145
See application file for complete search history.

(56) References Cited

U.S. PATENT DOCUMENTS

| | | | |
|---|---|---|---|
| 2014/0083012 A1 | 3/2014 | Boren | |
| 2014/0123571 A1* | 5/2014 | Swain | B64D 11/0023 29/401.1 |
| 2016/0039522 A1* | 2/2016 | Koyama | B64D 11/02 244/118.5 |
| 2018/0251222 A1* | 9/2018 | Banfield | E04H 1/1216 |
| 2021/0332627 A1 | 10/2021 | Brunner et al. | |
| 2021/0403165 A1* | 12/2021 | Scoley | E04H 1/125 |

FOREIGN PATENT DOCUMENTS

| | | | | |
|---|---|---|---|---|
| EP | 2974960 A1 | | 1/2016 | |
| WO | WO-2018067982 A1 | * | 4/2018 | ............. B64D 11/02 |
| WO | 2020092325 A1 | | 5/2020 | |

OTHER PUBLICATIONS

European Patent Office, Extended European Search Report Issued in Application No. 21217591.3, May 6, 2022, Germany, 10 pages.
European Patent Office, Office Action Issued in Application No. 21217591.3, Nov. 10, 2023, Germany, 8 pages.

* cited by examiner

*Primary Examiner* — Joshua J Michener
*Assistant Examiner* — Arfan Y. Sinaki
(74) *Attorney, Agent, or Firm* — Alleman Hall & Tuttle LLP

(57) ABSTRACT

A lavatory is provided which includes a plurality of walls including a first wall having a doorway, and an expandable door. The expandable door includes a main panel having dimensions that conform to the doorway and a main hinge connecting the main panel to the first wall. The lavatory further includes a latch. The main panel is configured to, in a deployed state, increase in at least one dimension to form a privacy barrier around an expansion zone located outside of the plurality of walls. The latch is configured to lock the expandable door in place in the deployed state.

22 Claims, 16 Drawing Sheets

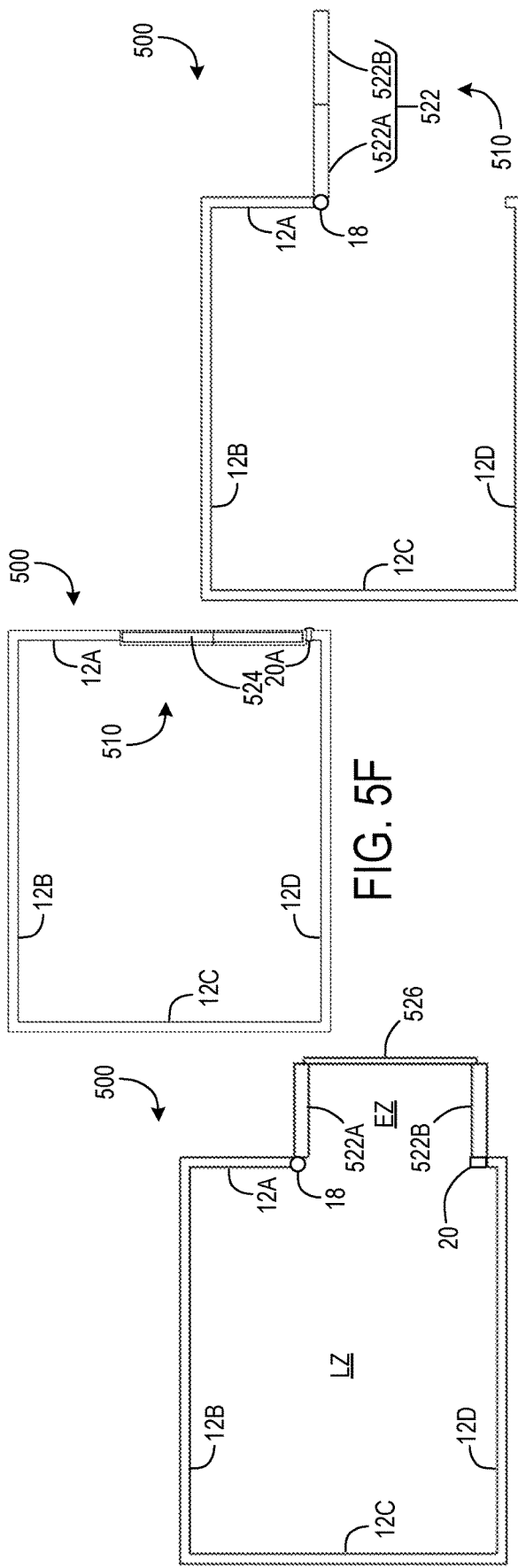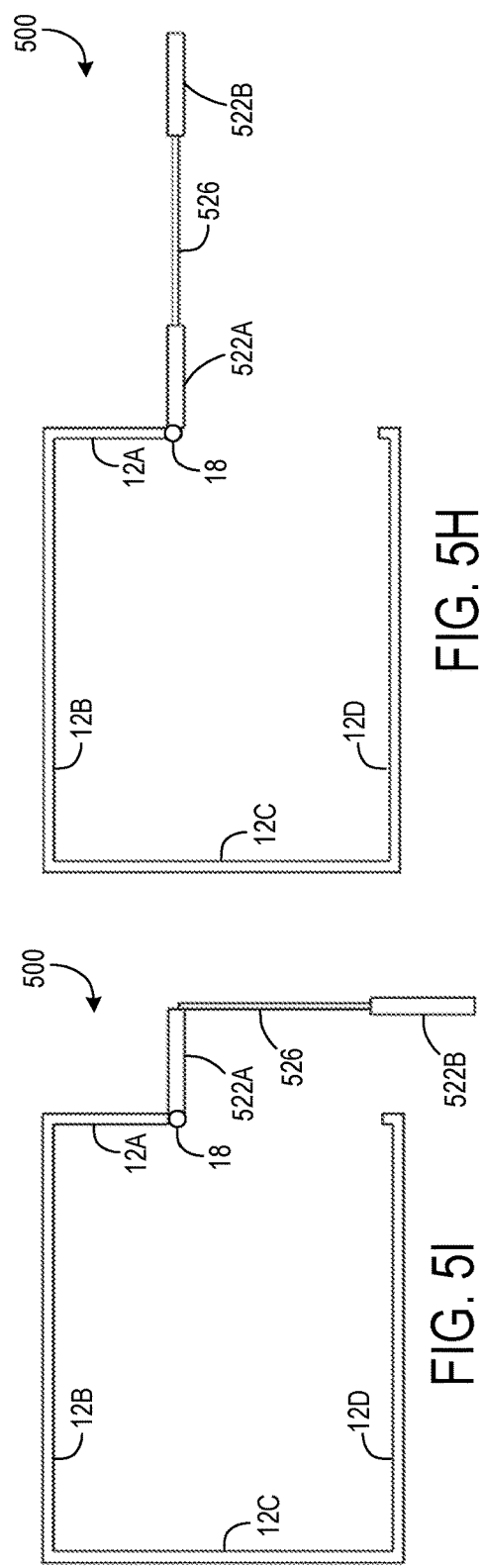

LAVATORY WITH EXPANDABLE DOOR

CROSS REFERENCE TO RELATED APPLICATIONS

This application claims priority to U.S. Provisional Patent Application Ser. No. 63/134,126, filed Jan. 5, 2021, the entirety of which is hereby incorporated herein by reference for all purposes.

FIELD

The present disclosure relates generally to lavatory design for wheelchair accessibility, and more particularly to the design of expandable doors for lavatories on board aircraft and other transportation apparatuses.

BACKGROUND

In order to properly accommodate passengers who use wheelchairs, wide body aircraft having two aisles typically include at least one wheelchair accessible lavatory. However, smaller, narrow body aircraft with only one aisle generally lack an accessible lavatory and instead utilize on-board wheelchairs which are narrow enough to fit through the aisle to bring the passenger to the lavatory. Once at the lavatory, the passenger is shielded from view, for example, by one or more privacy curtains blocking the aisle. While privacy curtains do offer a measure of privacy, they have the disadvantage of occupying cabin space even when stowed.

Another challenge is providing accessible lavatories in a cost-effective manner. For an existing fleet, retrofitting narrow body aircraft with wheelchair accessible lavatories would be time consuming and expensive, as in each aircraft the entire monument would be replaced, and could require removal of one or more rows of seats. For future aircraft purchases, manufacturing new aircraft with original wheelchair accessible lavatories would incur substantial costs, and furthermore, other aircraft features, such as rows of seats, would likely be sacrificed to secure the dedicated space required for such a lavatory. A challenge exists to provide an improved lavatory experience for wheelchair users, while minimizing aisle blockage during use and storage, in an economical manner for airline operation.

SUMMARY

To address the above issues, according to one aspect of the present disclosure, a lavatory is provided herein. In this aspect, the lavatory includes a plurality of walls including a first wall having a doorway, and an expandable door. The expandable door includes a main panel having dimensions that conform to the doorway and a main hinge connecting the main panel to the first wall. The lavatory further includes a latch. The main panel is configured to, in a deployed state, increase in at least one dimension to form a privacy barrier around an expansion zone located outside of the plurality of walls. The latch is configured to lock the expandable door in place in the deployed state.

Another aspect of the present disclosure relates to a method of manufacturing a lavatory. In this aspect, the method includes providing a lavatory enclosure having a first volume. The method includes attaching an expandable door configured to convert between the following latched states: a first latched state in which the expandable door is arranged to close an opening of the lavatory enclosure, and a second latched state in which the expandable door is manipulated to enclose an expansion zone outside of the lavatory enclosure having a second volume contiguous with the first volume.

Still another aspect of the present disclosure relates to an expandable door for retrofitting to an aircraft lavatory. The expandable door includes a main panel, a main hinge connecting the main panel to wall of the aircraft lavatory, and a latch. The main panel is configured to, in a deployed state, increase in at least one dimension to form a privacy barrier around an expansion zone located outside of the plurality of walls. The latch is configured to lock the expandable door in place in the deployed state.

BRIEF DESCRIPTION OF THE DRAWINGS

FIGS. 5F-5J show top views of the lavatory in the progression.

DETAILED DESCRIPTION

Figure 1A:
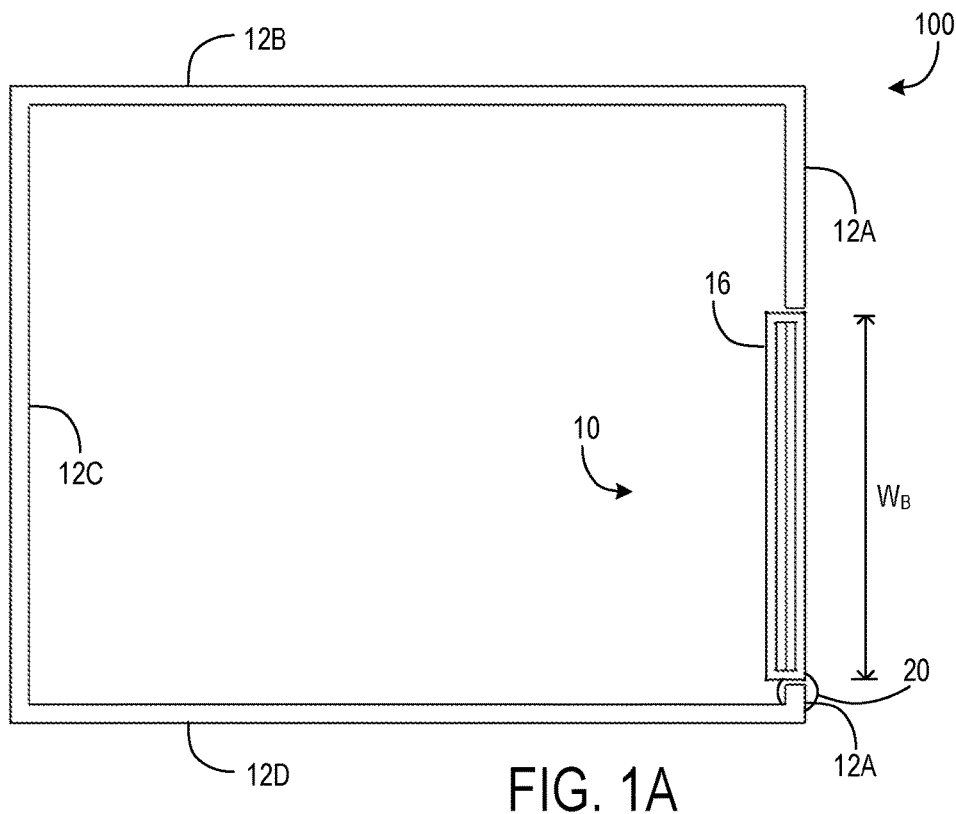
FIGS. 1A-1E show a lavatory with an expandable door in a first embodiment according to the present disclosure, in a progression of expanding from a stowed state to a deployed state.
Figure 1B:
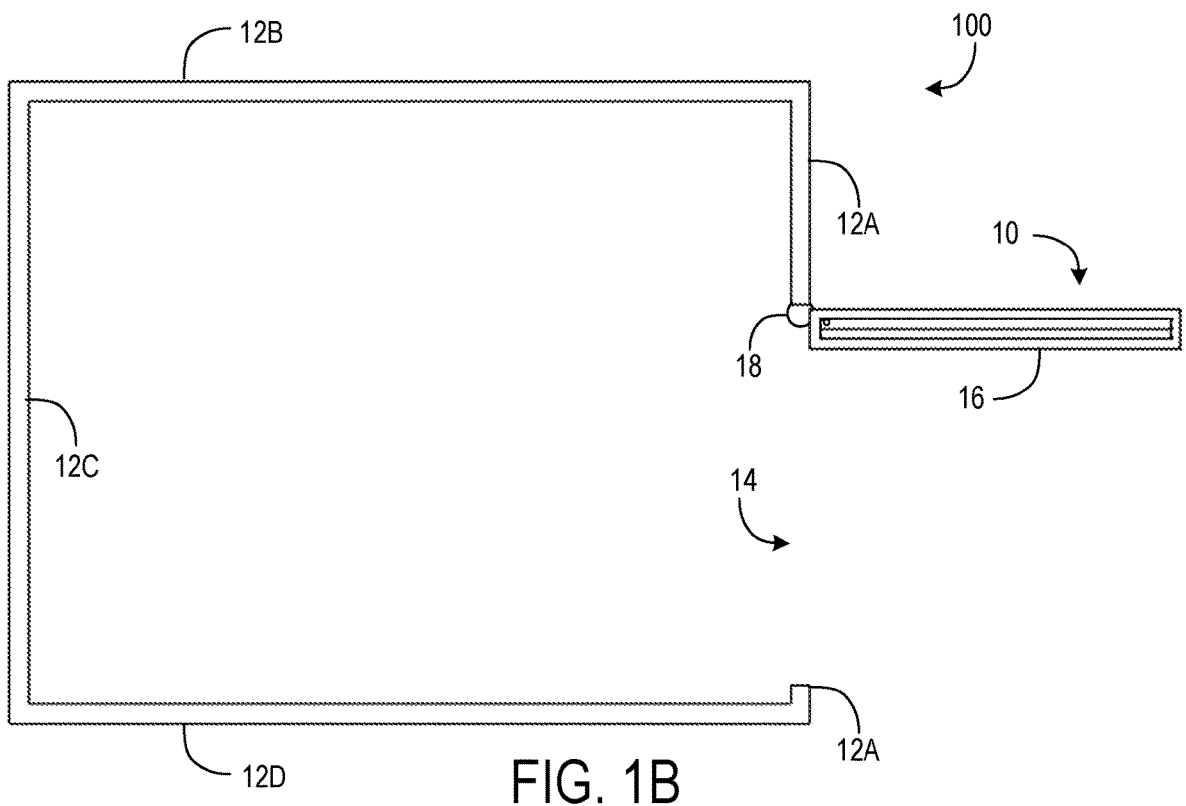

FIGS. 1A-1E show a lavatory 100 with an expandable door 10 according to a first embodiment of the present disclosure. The lavatory 100 includes a plurality of walls 12A-D including a first wall 12A having a doorway 14, and the expandable door 10. The expandable door 10 includes a main panel 16 having dimensions that conform to the doorway 14 and a main hinge 18 connecting the main panel 16 to the first wall 12A. The lavatory 100 includes a latch 20, which may be of any suitable type and will be described further below with reference to FIG. 1E. FIG. 1A shows a basic closed state and FIG. 1B shows a basic opened state where the main panel 16 may be used as a basic lavatory door. It will be appreciated that the top view of FIGS. 1A and 1B illustrate the inside of the main panel 16, but the top of the main panel 16 may be covered.

Figure 1C:
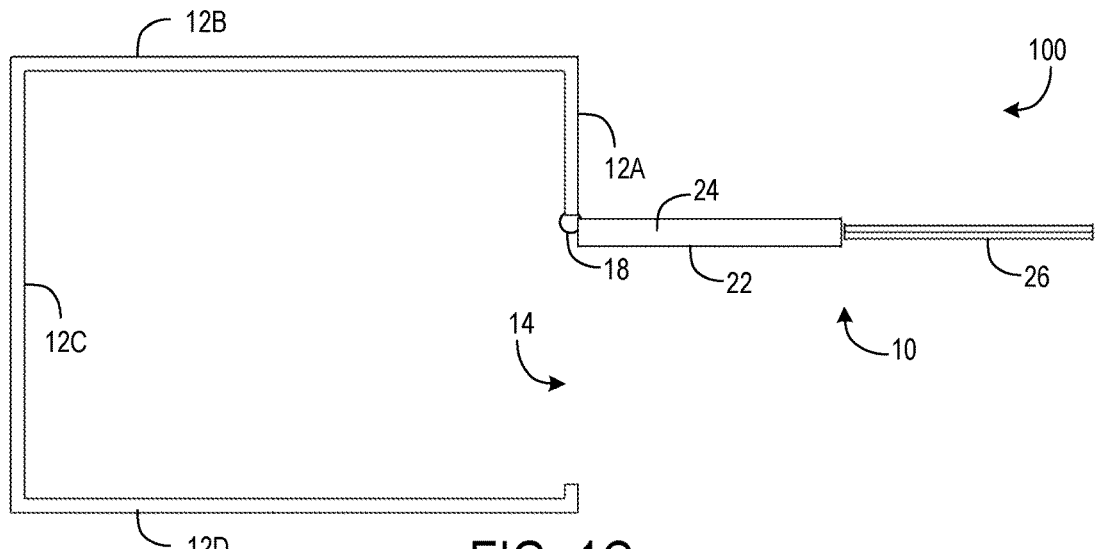
Figure 1D:
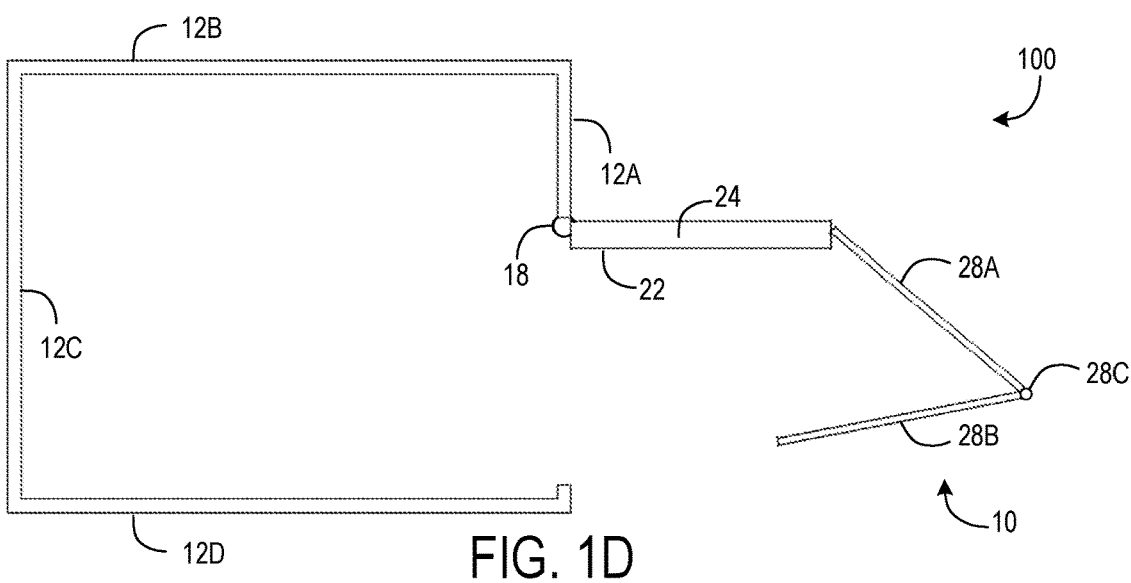
Figure 1E:
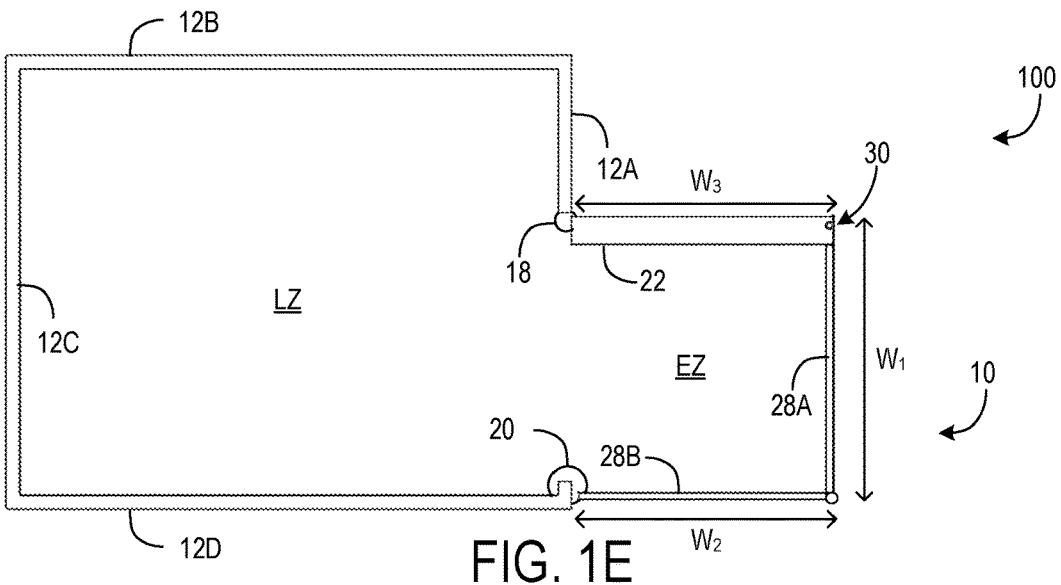

As shown in FIG. 1E, the main panel 16 is configured to, in a deployed state, increase in at least one dimension to form a privacy barrier around an expansion zone EZ located outside of the plurality of walls 12A-D. In this manner, a basic lavatory zone LZ may be increased by the addition of the expansion zone EZ, allowing a passenger extra space to transfer from an on-board wheelchair to a toilet of the lavatory in privacy, for example. The latch 20 is configured to lock the expandable door 10 in place in the deployed state, presenting the passenger with equal privacy and control of access to the lavatory 100 compared to the expandable door 10 functioning as a basic door, that is, fitting into the doorway 14 in an unexpanded state. It will be understood that the above description of the first embodiment is applicable to all other disclosed embodiments and combinations thereof.

Figure 8:
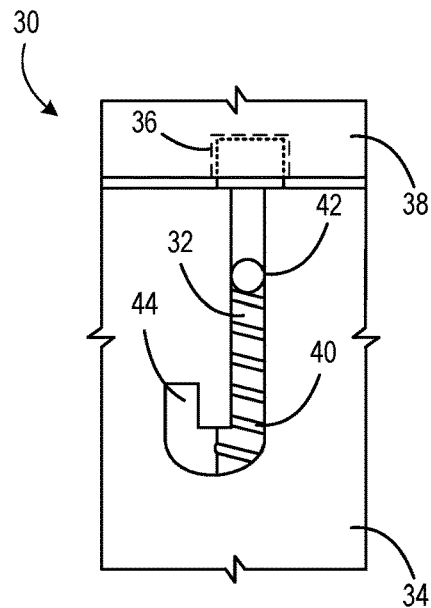
FIG. 8 shows a joint for use in the lavatory and expandable door of any embodiment.

In the first embodiment, the main panel 16 includes an outer panel 22 having a hollow space 24 inside, and a pocket extension 26 configured to slide out from the hollow space 24 at a side opposite of the main hinge 18 (see FIG. 1C). The pocket extension 26 includes a pair of foldable pocket panels 28A, 28B joined by a pocket hinge 28C (see FIGS. 1D-1E). As shown in FIG. 1E, the main panel 16 includes a joint 30 that allows the pocket extension 26 to slide within the hollow space 24 and connects to a first pocket panel 28A of the pair of foldable pocket panels 28A, 28B to the outer panel 22 in the deployed state. Turning briefly to FIG. 8, one example of the joint 30 which may be used in a variety of ways in various embodiments is shown. The joint 30 may be a slider pin 32 mounted to the pocket extension 26 that is depressed within the a door panel 34 (here, pocket extension 26) when inside the hollow space 24, with a socket 36 at the edge of an auxiliary panel 38 (here, the outer panel 22) for holding the pin 32 in place when the pocket extension 26 is removed its maximum extent from the hollow space 24 (shown in FIG. 1C). The joint 30 may be spring loaded with a spring 40 such that the slider pin 32 is automatically pushed up into the socket 36 when the pocket extension 26 is pulled free from the hollow space 24, or the joint 30 may be manually latched. Alternatively, an edge of the outer panel 22 from the bottom to the top may be rotatable with the pocket extension 26 once the joint 30 is in place, or yet another type of joint may be utilized.

The joint 30 may include a mechanism for releasing the joint 30, such as a finger hold 42 on the slider pin 32 configured to move through a slot 44, or a separate unlatching mechanism, for returning the pocket extension 26 to the inside of the outer panel 22 when the expansion zone EZ is no longer needed. The mechanism may be hidden or flush with the panel so that only a crew member may know to operate the mechanism, thereby maintaining the privacy, safety, and autonomy of the passenger in the lavatory 100. Including the joint 30 with the mechanism may reduce incidence of an operator of the expandable door 10 prematurely attempting to rotate the pocket extension 26 relative to the outer panel 22 when the pocket extension 26 is out of place because the operator will feel and hear when the joint 30 clicks into place and also when the joint 30 is released. Accordingly, wear and tear of the expandable door 10 may be reduced.

The pair of foldable pocket panels 28A, 28B are configured to be stored inside of the outer panel 22 in a folded state (see FIGS. 1A-1B), and after sliding out from the hollow space 24 (see FIG. 1C), unfold at the pocket hinge 28C (see FIG. 1D) to transition to the deployed state of the expandable door 10. As shown in FIG. 1E, the latch 20 connects a second pocket panel 28B of the pair of foldable pocket panels 28A, 28B to the first wall 12A. The latch 20 may connect the second pocket panel 28B to the first wall 12A by directly engaging with both components, or may, for example, lock the second pocket panel 28B in place via engagement with the ceiling or floor when the second pocket panel 28B is adjacent the first wall 12A. In this manner, the lavatory 100 of the first embodiment is easily expanded to add the expansion zone EZ to the basic lavatory zone LZ. In this embodiment, the door width ($W_1+W_2+W_3$) may increase to approximately three times a basic door width ($W_B$) when expanded (see FIGS. 1A and 1E for comparison). In addition, due to the hollow space 24, most of the moving parts used to deploy the privacy barrier are protected inside of the outer panel 22 during regular use and are stowed out of the way.

Shown in FIGS. 1A and 1E merely by way of example, in any of the disclosed embodiments, the latch 20 may be further configured to lock the expandable door 10 (210, 310 . . . ) in place in a closed state in which the expandable door 10 covers the doorway 14 and the privacy barrier around the expansion zone EZ is not formed. Thus, the lavatory 100 may be closed and locked using the same latch both in the basic lavatory state such as is shown in FIG. 1A, and in the deployed state, such as is shown in FIG. 1E, reducing the number of parts used and increasing user friendliness.

Figure 2A:
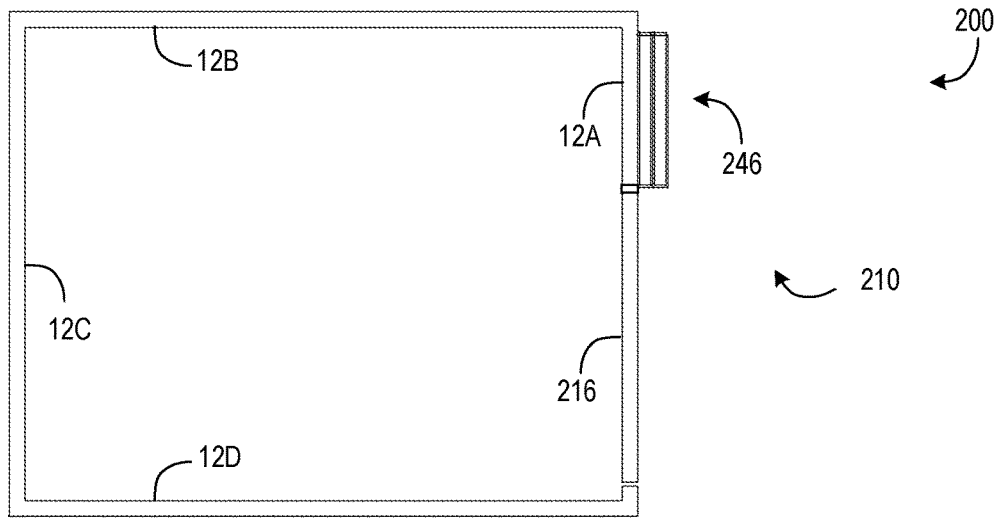
FIGS. 2A-2C show a lavatory with an expandable door in a second embodiment according to the present disclosure, in a progression of expanding from a stowed state to a deployed state.
Figure 2B:
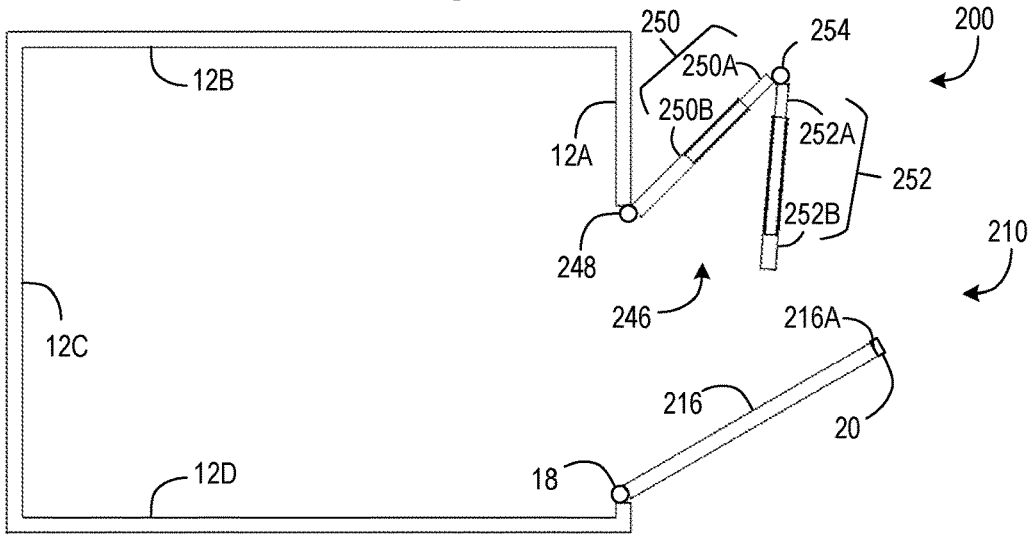
Figure 2C:
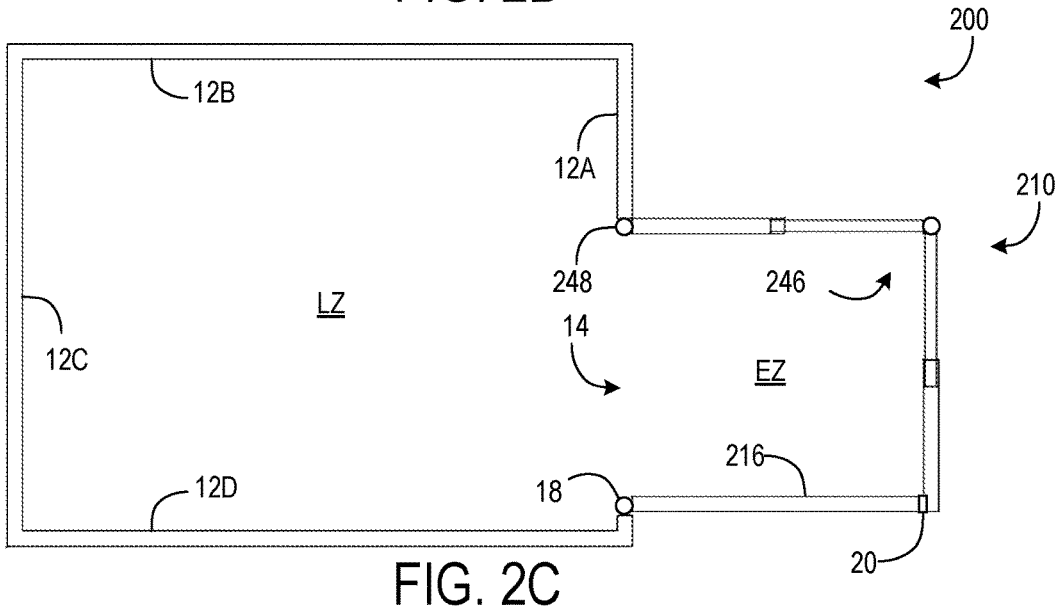

FIGS. 2A-2C show a lavatory 200 with an expandable door 210 in a second embodiment according to the present disclosure, in a progression of expanding from a stowed state to a deployed state. Some components of the lavatory 200 and the expandable door 210 are identical to corresponding components of the lavatory 100 and the expandable door 10 and therefore redundant description thereof is omitted.

In the second embodiment, the lavatory 200 further comprises a bifold door 246 connected to the first wall 12A at one side of the doorway 14. Here, the bifold door 246 is shown to the right side of the doorway 14, but the left side may be used as well. The bifold door 246 may be connected to the first wall 12A via a hinge 248, for example. The bifold door 246 includes a pair of extendable panels 250, 252 each having an inner panel 250A, 252A configured to be stowed inside of an outer panel 250B, 252B. The inner panels 250A, 252A may slide out of the respective outer panel 250B, 252B when deployed. Accordingly, when the bifold door 246 is stowed, it may be in a more compact form than when deployed, saving space onboard. A first extendable panel 250 of the pair of extendable panels 250, 252 is connected to the first wall 12A. A second extendable panel 252 of the pair of extendable panels 250, 252 is connected to the first extendable panel 250 at one side thereof, for example, via a hinge 254, and is configured to connect to an open end 216A of a main panel 216 at an opposite side thereof via the latch 20. The expandable door 210 is thus expandable by the addition of the bifold door 246 without including the weight and thickness of the bifold door 246 during regular use. Further, the lavatory 200 may be particularly easily retrofitted by adding the bifold door 246 and the latch 20, and in some cases, the expandable door 210 may otherwise be the original lavatory door.

FIGS. 3A-3D show a lavatory 300 with an expandable door 310 in a third embodiment according to the present disclosure, in a progression of expanding from a stowed state to a deployed state. In the third embodiment, a main panel 316 forms a trifold door together with a first trifold panel 356A and a second trifold panel 356B. The main panel 316 is connected to the first trifold panel 356A via a first hinge 358A at a side of the main panel 316 opposite of the main hinge 18, and the first trifold panel 356A is connected to the second trifold panel 356B via a second hinge 358B at a side of the first trifold panel 356A opposite of the first hinge 358A.

Figure 3A:
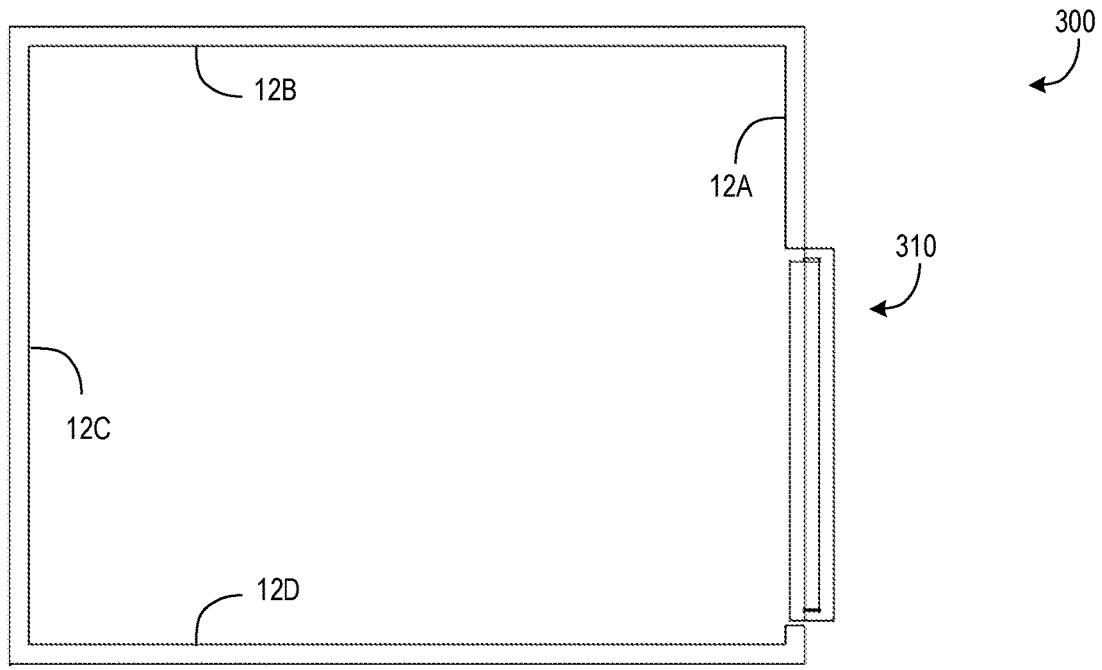
FIGS. 3A-3D show a lavatory with an expandable door in a third embodiment according to the present disclosure, in a progression of expanding from a stowed state to a deployed state.
Figure 3B:
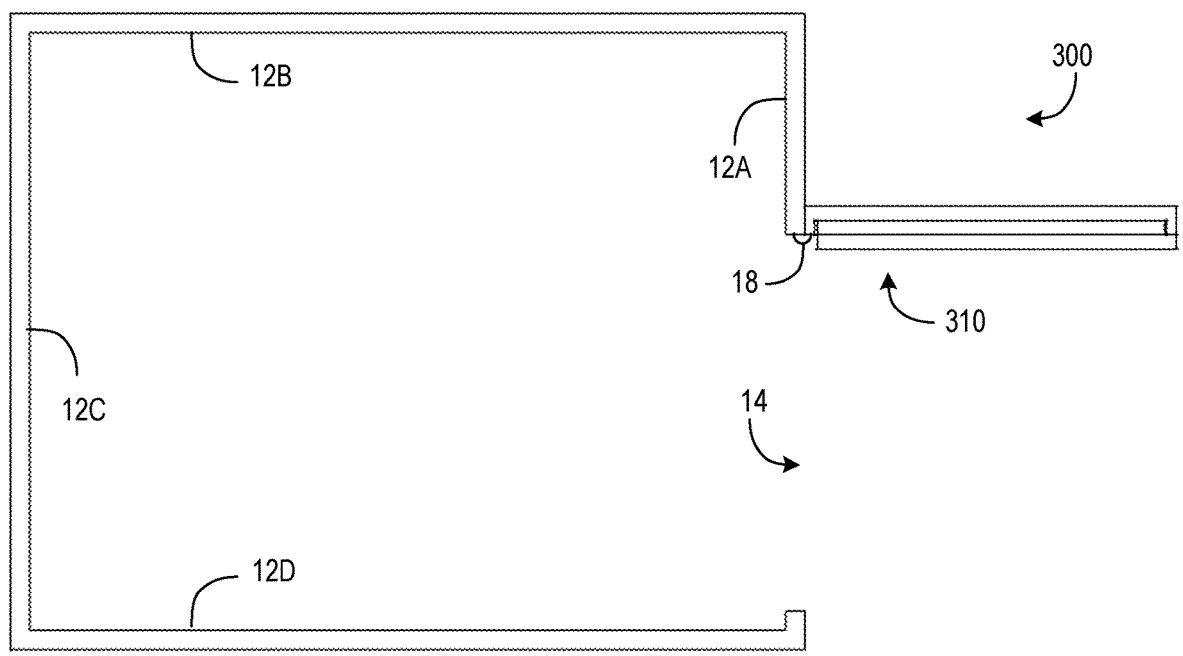
Figure 3C:
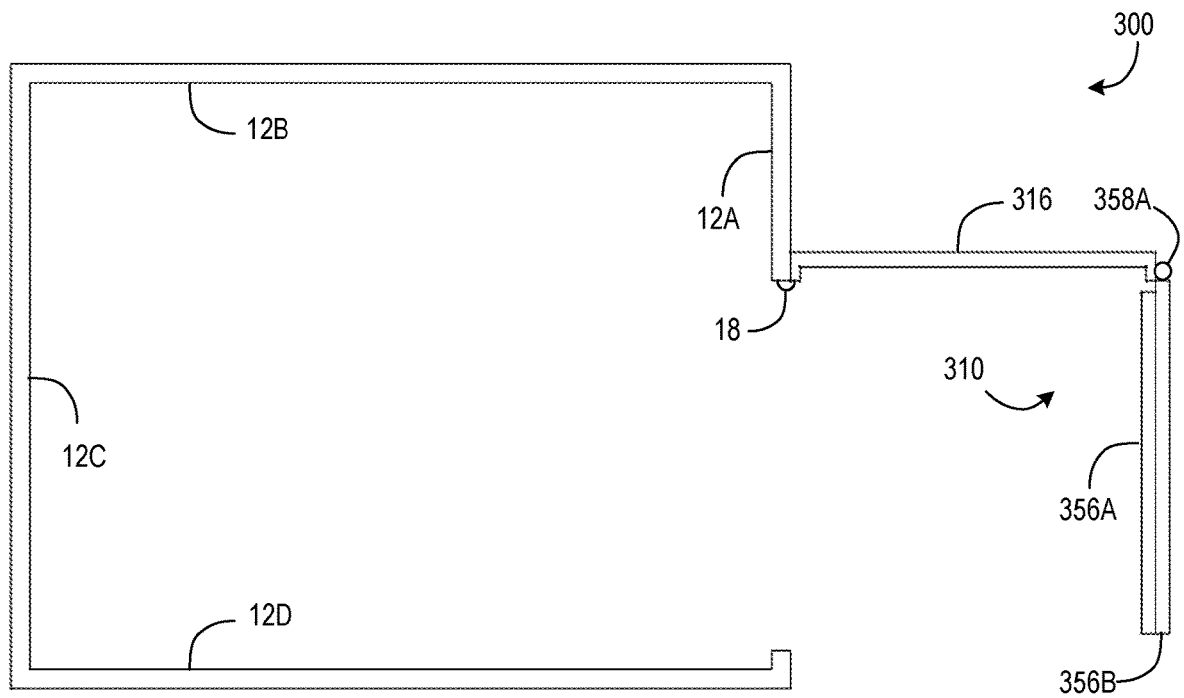
Figure 3D:
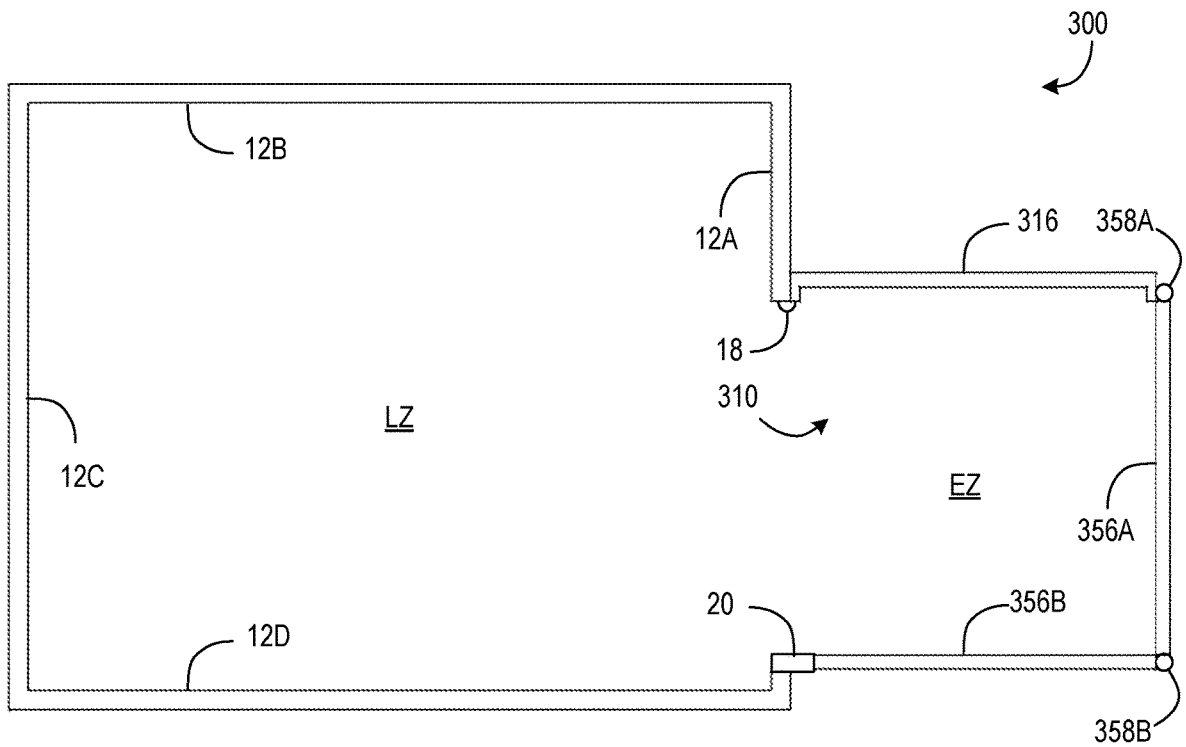

As shown in FIGS. 3A-3B, in a stowed state, the second trifold panel 356B is sandwiched between the main panel 316 and the first trifold panel 356A. Then, as shown in FIGS. 3C-3D, when transitioning to the deployed state, the trifold door is configured to unfold and the second trifold panel 356B is configured to connect to the first wall 12A at a side of the second trifold panel 356B opposite of the second hinge 358B, via the latch 20. The trifold door unfolds by opening the combination of the two trifold door panels 356A, 356B away from the main panel 316, and then opening the second trifold panel 356B away from the first trifold panel 356A. In this manner, the expandable door 310 may be switched out for the original lavatory door to retrofit the lavatory 300 with wheelchair accessibility without substantial additional hardware outside of the door.

Figure 4A:
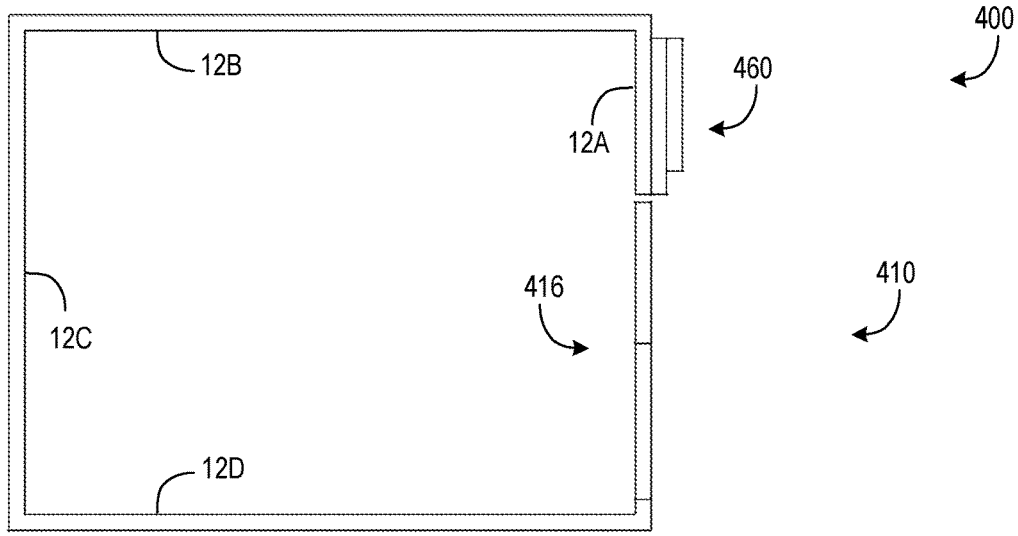
FIGS. 4A-4C show a lavatory with an expandable door in a fourth embodiment according to the present disclosure, in a progression of expanding from a stowed state to a deployed state.
Figure 4B:
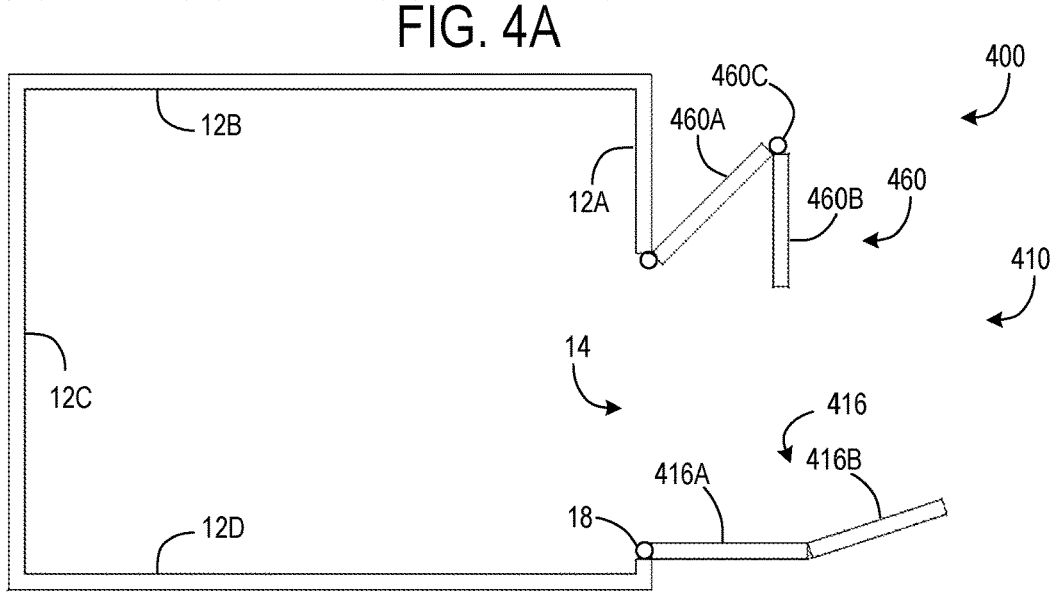
Figure 4C:
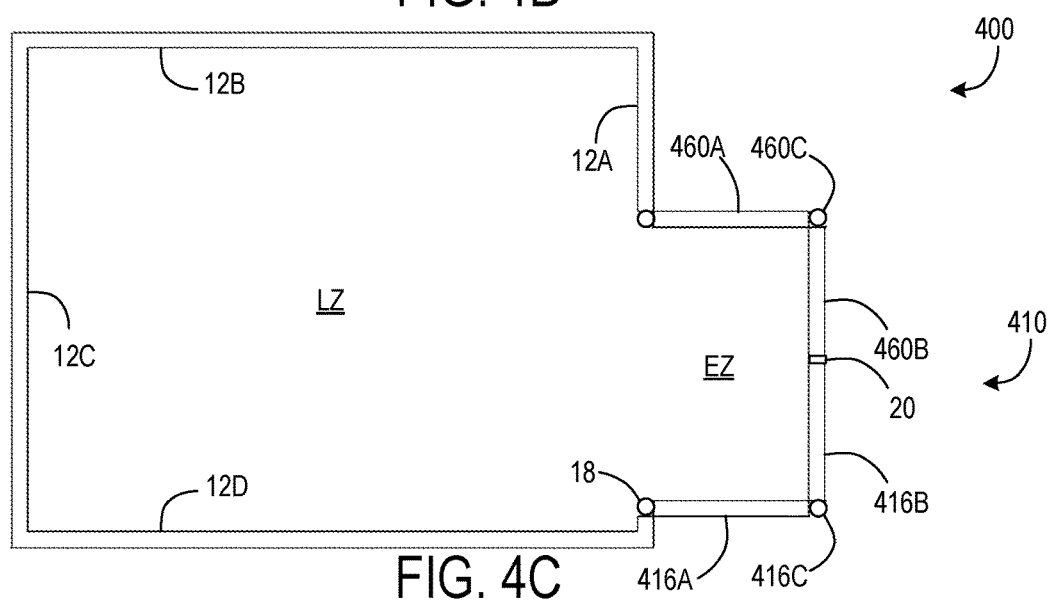

FIGS. 4A-4C show a lavatory 400 with an expandable door 410 in a fourth embodiment according to the present disclosure, in a progression of expanding from a stowed state to a deployed state. In the fourth embodiment, a main panel 416 is a first bifold door comprising a first bifold panel 416A connected to the first wall 12A via the main hinge 18 and a second bifold panel 416B connected to the first bifold panel 416A via a first bifold hinge 416C. In one example, the first bifold door may include a slider or pin configured to slide through a track (not shown) in the doorway 14 during normal use, and the slider may be spring loaded so that the end of the first bifold door opposite the main hinge 18 may be released from the track for deployment. The ceiling and/or floor outside the lavatory 400 may include sockets for the slider to engage with at the deployed position, for example. The joint 30 shown in FIG. 8 may be utilized, where the auxiliary panel 38 having the socket 36 is the ceiling and/or floor (if the floor is used, then the figure is rotated upside down). In addition, any of the embodiments disclosed herein may include one or more of the pins 32 with corresponding sockets 36 for stabilizing any panel in the deployed state. In another example, the main panel 416 may operate as a full-width door during basic use, but after a release (such as the joint 30) is activated, the main panel 416 is able to act as the first bifold door by folding about the first bifold hinge 416C. In this example, the slider and track may not be included, but pins 32 and sockets 36 for stabilizing may optionally be utilized.

The lavatory 400 further comprises a second bifold door 460. The second bifold door 460 includes a third bifold panel 460A connected to the first wall 12A at an opposite side of the doorway 14, and a fourth bifold panel 460B connected to the third bifold panel 460A via a second bifold hinge 460C. As shown in FIG. 4A, the second bifold door 460 may be securely stowed against the first wall 12A when not in use. As shown in FIG. 4C, the latch 20 connects the second bifold panel 416B of the first bifold door to the fourth bifold panel 460B of the second bifold door 460. Because the expandable door 410 of the fourth embodiment uses the main panel 416 which folds in half when deploying, the expansion zone EZ may be approximately half the size compared to using a solid full-width door, because the extent of the expansion zone into the space outside of the lavatory 400 is only half of the width of the doorway 14. Thus, this embodiment may be an option to conserve more space if the size of the expansion zone is sufficient to fit the onboard wheelchair and allow the passenger to move freely.

FIGS. 5A-5E show perspective views of a lavatory 500 with an expandable door 510 in a fifth embodiment according to the present disclosure, in a progression of expanding from a stowed state to a deployed state. FIGS. 5F-5J show corresponding top views. While only the vertical sides of the lavatory 500 are shown, it will be appreciated that when installed, the lavatory of all embodiments customarily includes a floor and ceiling as well.

Figure 5C:
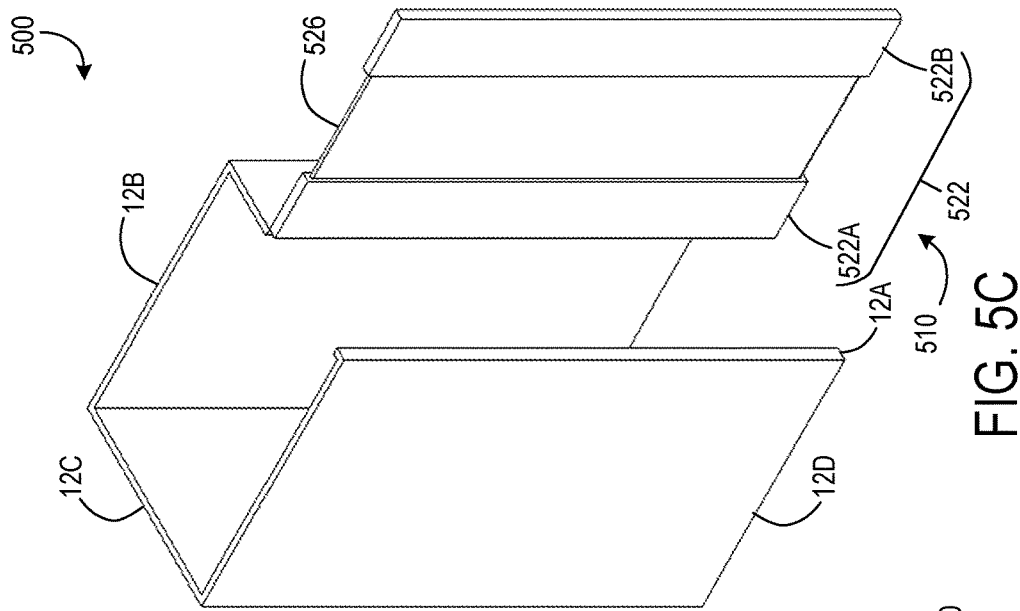
FIGS. 5A-5E show perspective views of a lavatory with an expandable door in a fifth embodiment according to the present disclosure, in a progression of expanding from a stowed state to a deployed state.
Figure 5B:
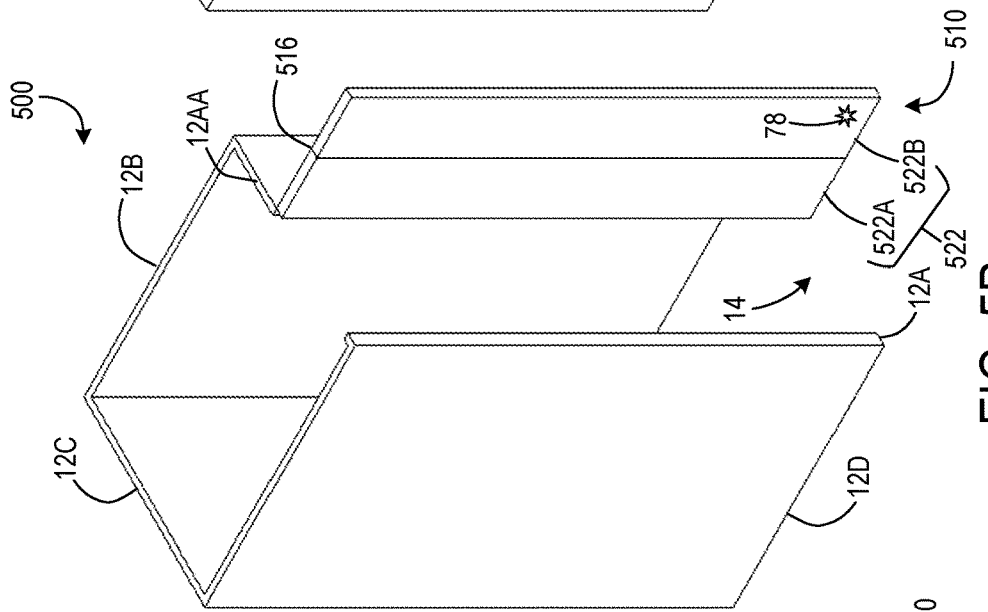
Figure 5A:
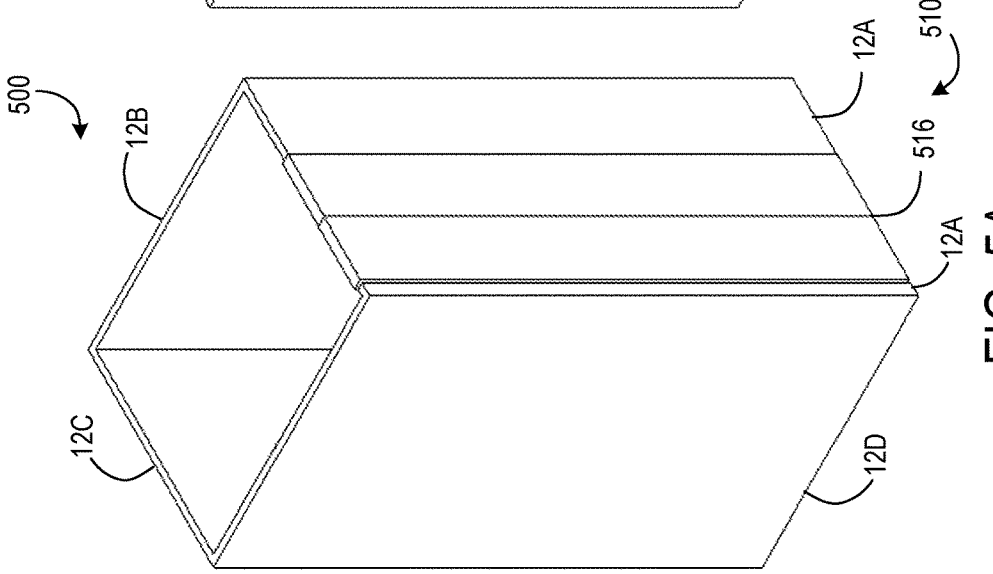
Figure 5E:
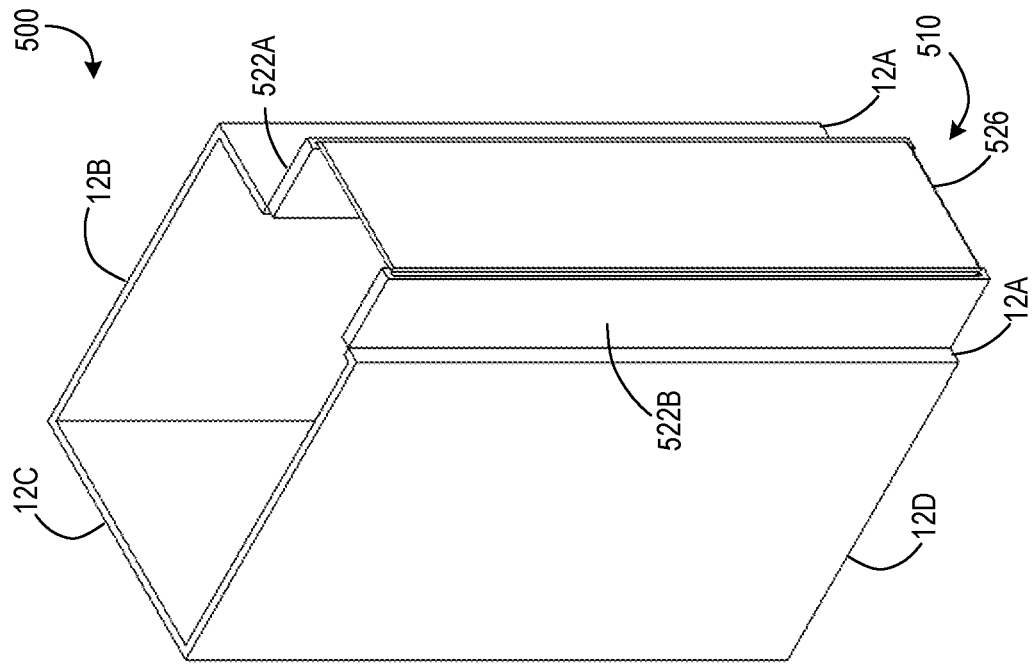
Figure 5D:
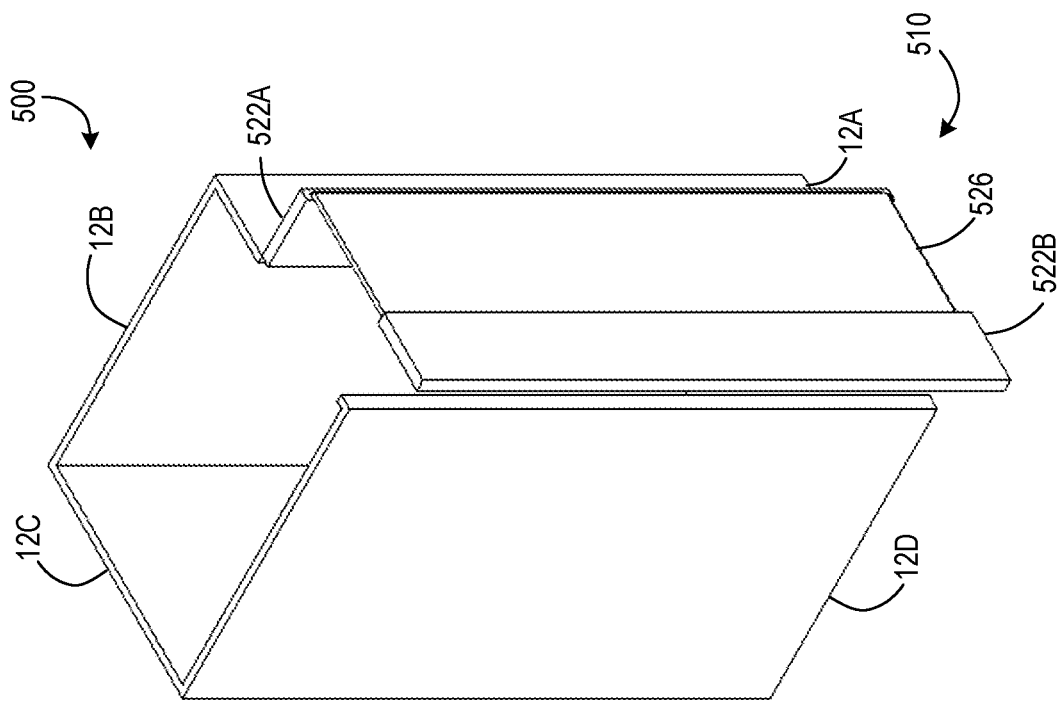

In the fifth embodiment, a main panel 516 includes an outer panel 522 having a hollow space 524 inside (see FIG. 5F), similar to the first embodiment. However, here, the outer panel 522 is configured to split apart into a first half 522A and a second half 522B arranged side by side. In the illustrated embodiment, the first half 522A is a right half and the second half 522B is a left half, but the reverse configuration may be used instead. As shown in FIG. 5C-5E, the main panel 516 includes a pocket extension 526 configured to slide out from the hollow space 524 (see FIG. 5F) when the first and second halves 522A, 522B of the outer panel 522 are separated from one another. Once the pocket extension 526 slides out from the hollow space 524 (see FIG. 5F), as shown in FIG. 5B, the pocket extension 526 is rotatably coupled to the first and second halves 522A, 522B of the outer panel 552. This may be achieved similarly to in the first embodiment, in which a slidable joint may click into place and a release mechanism may be optionally utilized, and therefore repeat description from the first embodiment will be omitted. Such a slidable joint may be used in each of the two halves 522A, 522B of the outer panel 522.

FIG. 5B also illustrates a mechanism 78 compatible with any of the disclosed embodiments which may be hidden, inconspicuously located, flush with the door panel, or unlockable with a specially shaped tool, for example. The mechanism 78 may be used to unlock the two halves 552A, 552B of the outer panel 552 so that an unwitting passenger does not deploy the expandable door 510 when it is not needed.

Figure 5L:
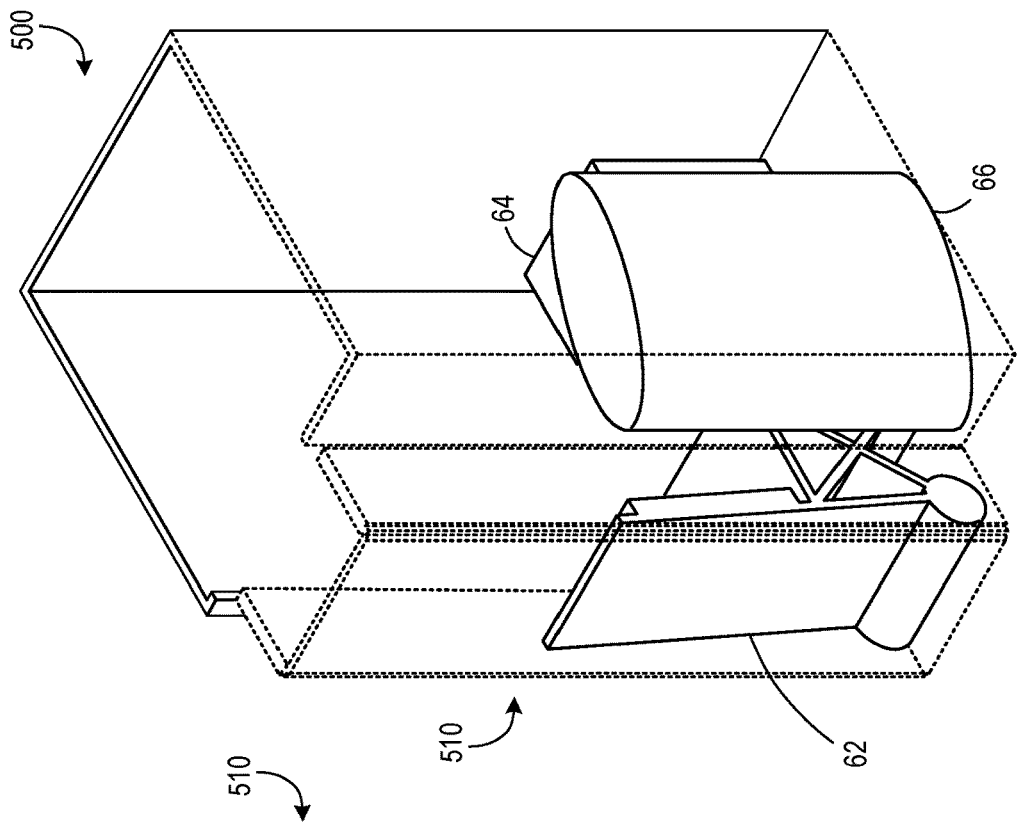
FIG. 5L shows a perspective view of the lavatory with the on-board wheelchair accommodated therein.
Figure 5K:
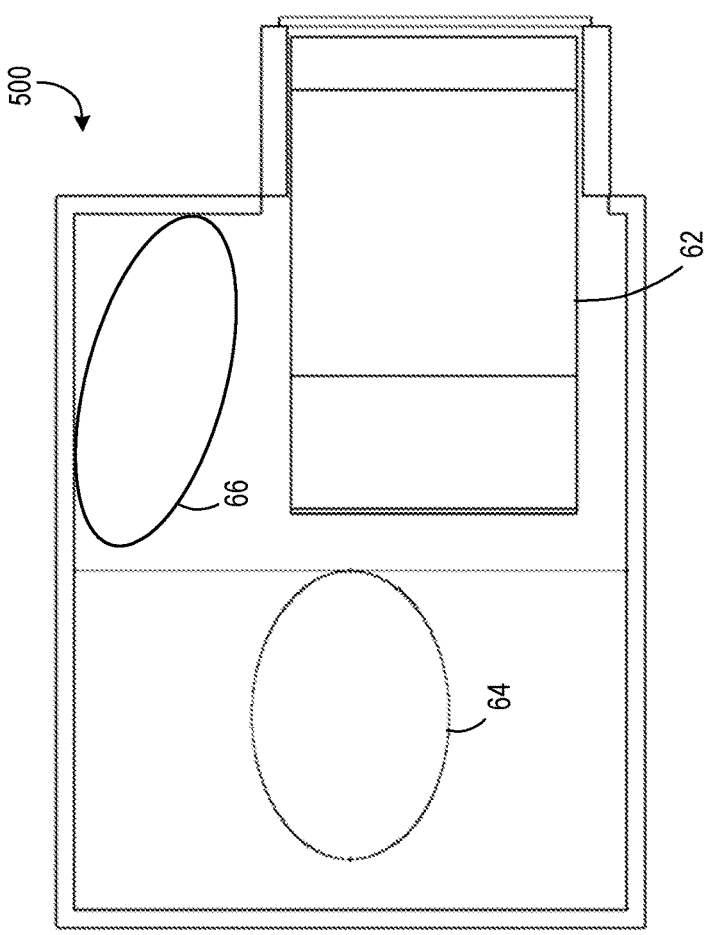
FIG. 5K shows a top view of the lavatory with an on-board wheelchair accommodated therein.

As shown in FIG. 5G, the first half 522A of the outer panel 522 is connected to the first wall 12A at one side of the doorway 14 via the main hinge 18, and as shown in FIG. 5J, the second half 522B of the outer panel 522 is configured to latch to the first wall 12A at an opposite side of the doorway 14, via the latch 20. Like the fourth embodiment, the fifth embodiment provides a smaller but still sufficient expansion zone EZ so that more space may be saved. FIGS. 5K-5L show that an on-board wheelchair 62 may fit within the combination of the basic lavatory zone LZ and the expansion zone EZ with a toilet 64 and sink 66 both present. Half of the walls 12A-D of the lavatory 500 are shown in dashed lines in FIG. 5L to display the inside while also showing the location of the walls 12A-D. Thus, the expansion zone EZ may be sized to accommodate a wheelchair 62. Accordingly, the passenger has ample room to move between the on-board wheelchair 62 and the toilet 64 in this and the other embodiments. For any of the disclosed embodiments, as viewed from above, the expansion zone may have an area of about 10% to about 40% of a lavatory area bounded by the plurality of walls, about 15% to about 35%, or about 20% to about 30%. These values provide sufficient space for the passenger to use the lavatory while reducing added weight, reducing lost space, and providing user friendliness with reasonably sized and reasonably numbered panels.

Shown in FIGS. 5F and 5J merely by example, in any of the disclosed embodiments, the latch 20 may be an auxiliary latch and the lavatory 500 may further comprise a main latch 20A configured to lock the expandable door 510 in place in a closed state in which the expandable door 510 covers the doorway 14 and the privacy barrier around the expansion zone EZ is not formed. The latches 20, 20A may be considered part of the expandable door 510, part of the doorframe, or both. The different latches 20, 20A may be located at different heights, oriented in different directions, etc. In this manner, the lavatory 500 may be closed and locked using one latch in the basic lavatory state such as is shown in FIG. 5F, and a different latch in the deployed state, such as is shown in FIG. 5J, simplifying the design.

Figure 6B:
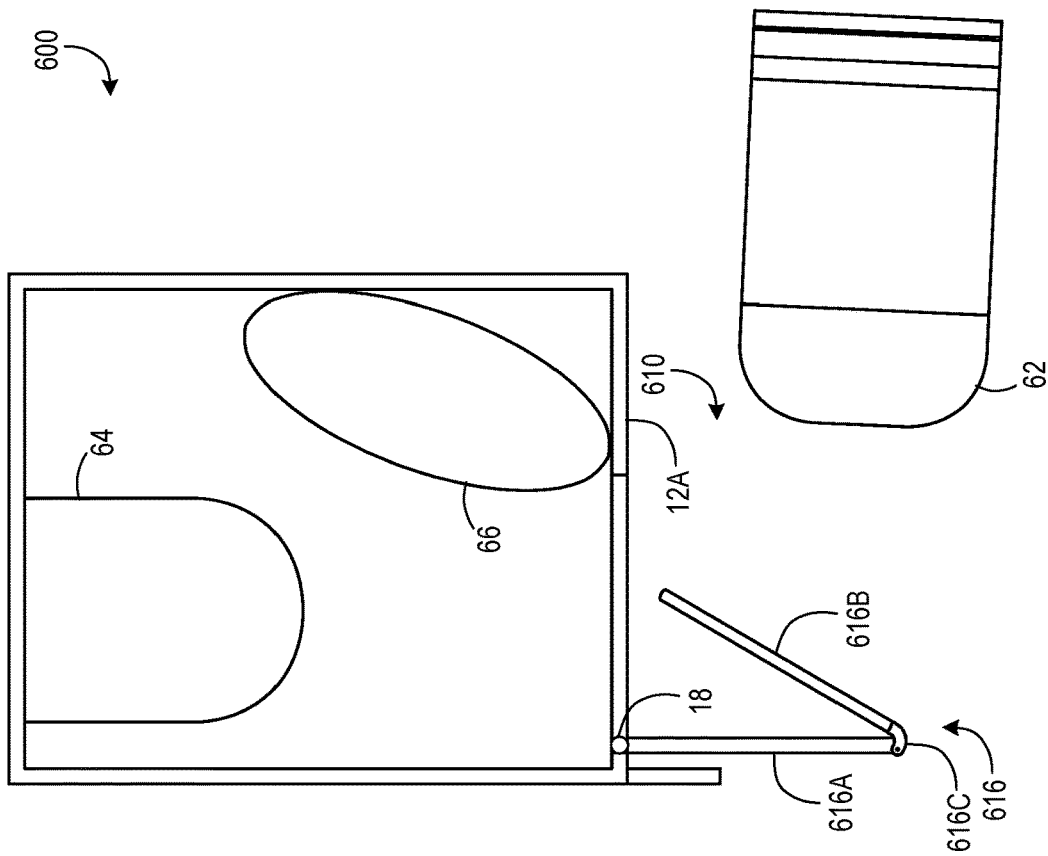
FIGS. 6A-6E show a lavatory with an expandable door in a sixth embodiment according to the present disclosure, in a progression of expanding from a stowed state to a deployed state.
Figure 6A:
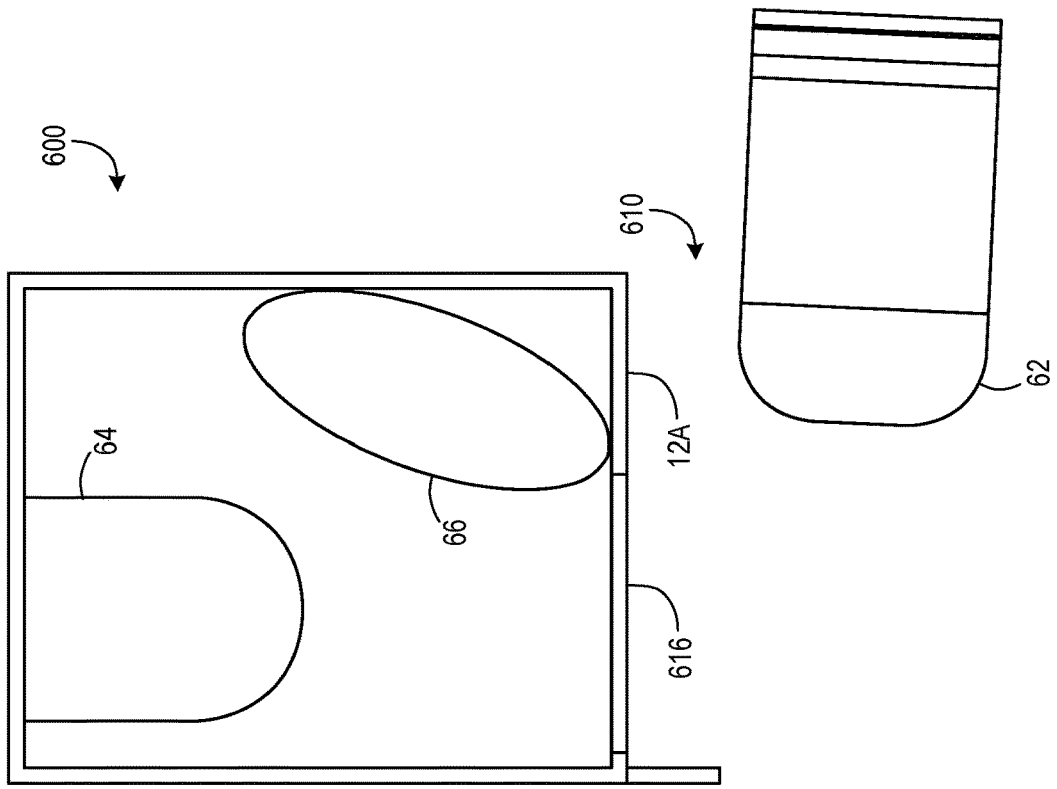
Figure 6E:
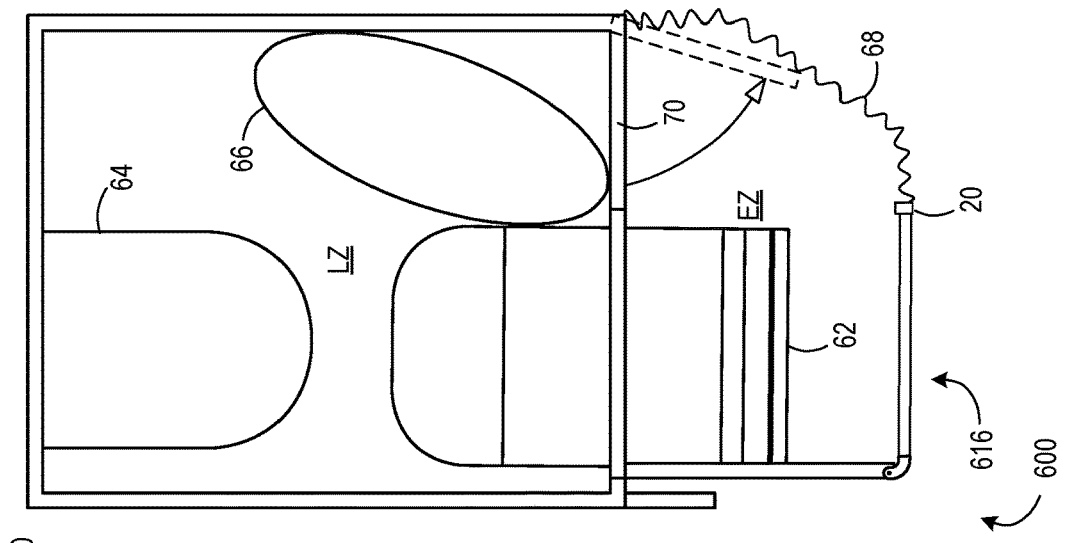
Figure 6D:
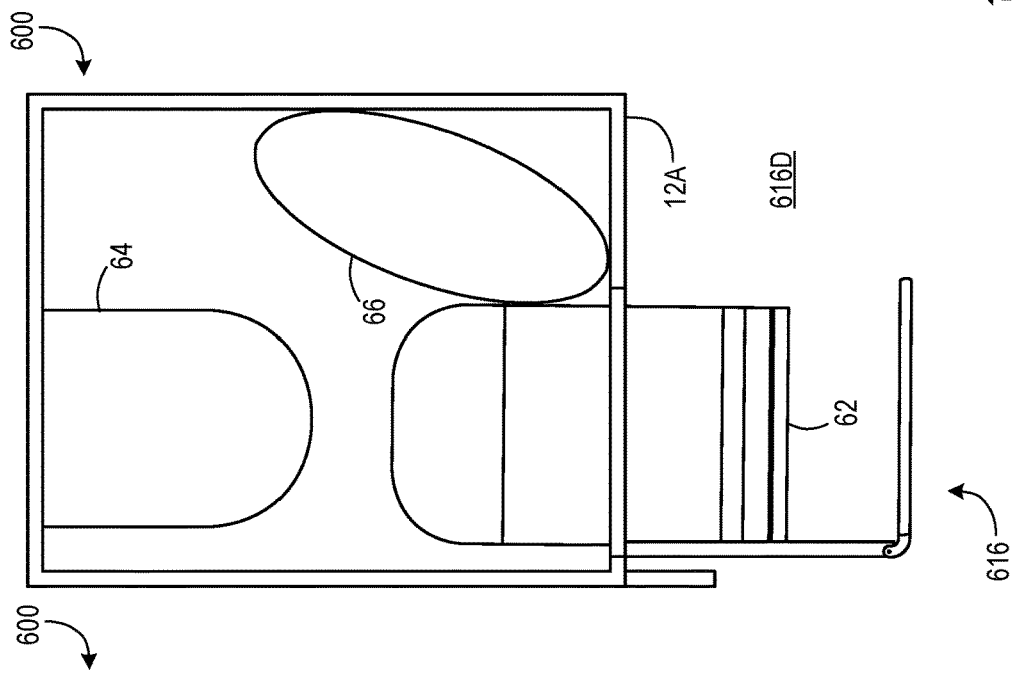
Figure 6C:
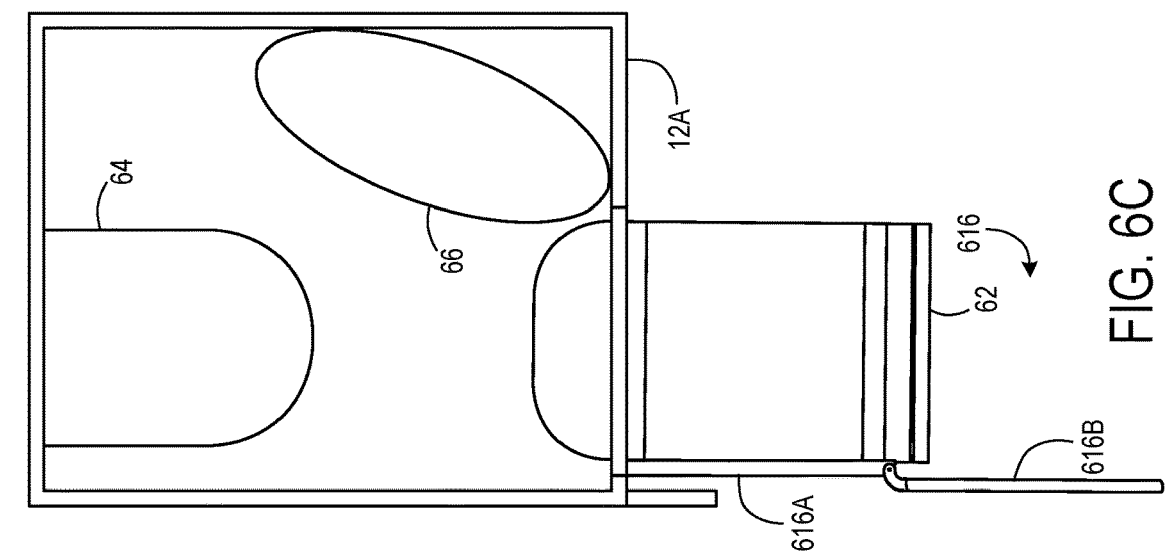
Figure 6G:
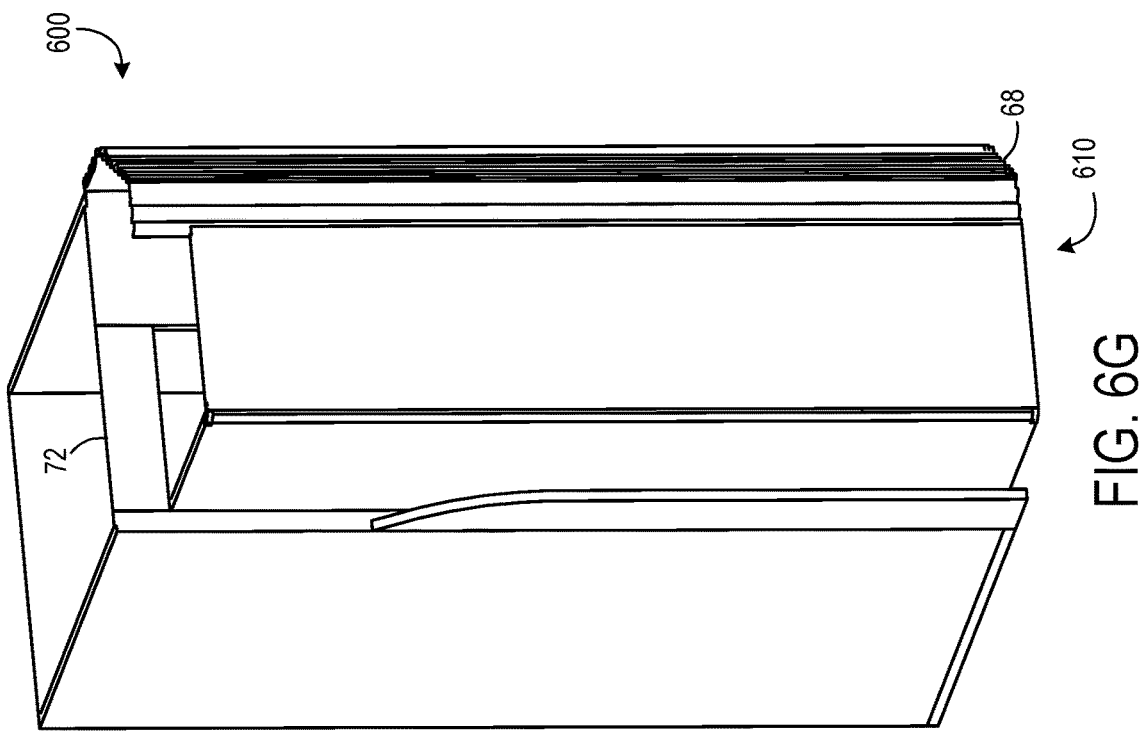
FIGS. 6F-6G show perspective views of the lavatory.
Figure 6F:
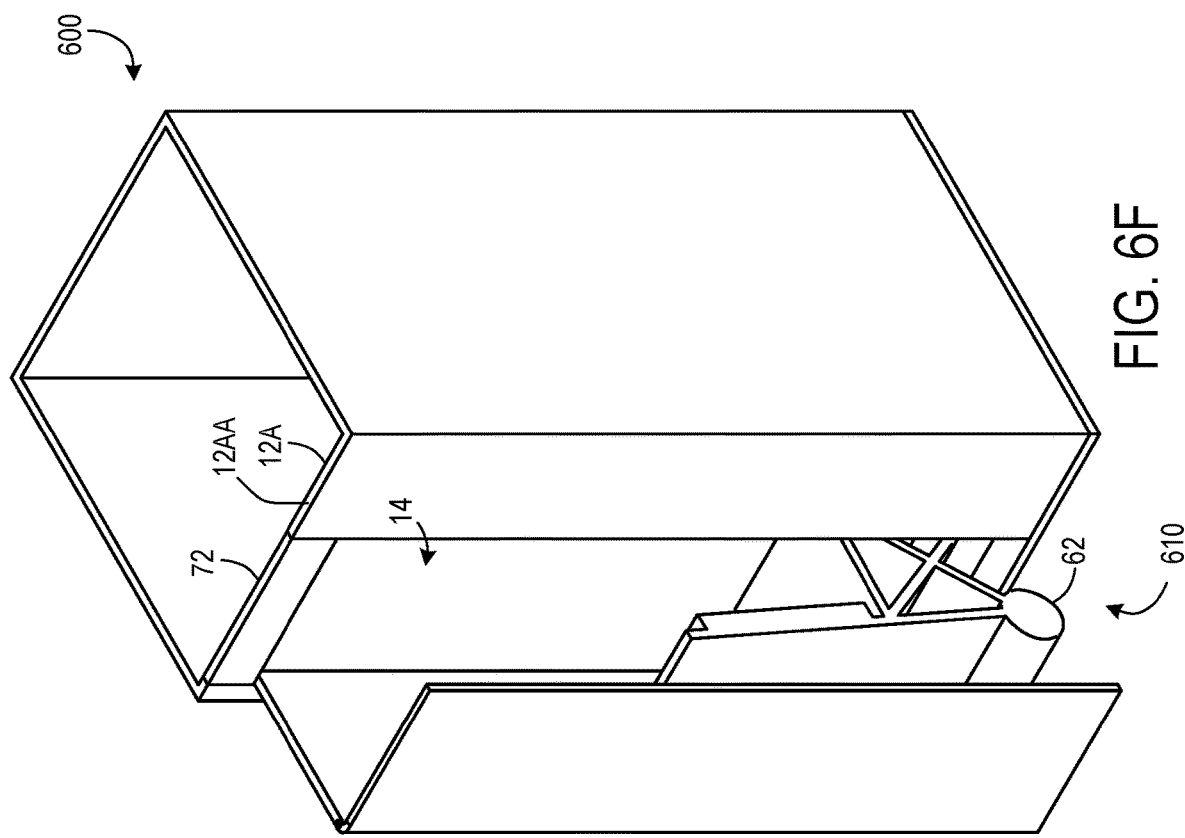

FIGS. 6A-6E show a lavatory 600 with an expandable door 610 in a sixth embodiment according to the present disclosure, in a progression of expanding from a stowed state to a deployed state, and FIGS. 6F-6G show perspective views of the lavatory 600. In the sixth embodiment, the lavatory 600 further comprises a privacy curtain 68 to be used in conjunction with a main panel 616. When not in use, the privacy curtain may be stowed against or next to the lavatory 600. Here, a main panel 616 is a bifold door comprising a first bifold panel 616A connected to the first wall 12A via the main hinge 18 and a second bifold panel 616B connected to the first bifold panel 616A via a first bifold hinge 616C. Unlike the bifold door of the fourth embodiment, the bifold door of the sixth embodiment is a full-width bifold door, similar to the trifold door of the third embodiment. That is, each bifold panel 616A, 616B is approximately the full width of the doorway 14, rather than approximately half of the width. However, in the deployed state, the bifold door is opened such that the second bifold panel 616B is separated from the first wall 12A by an opening 616D, and the privacy curtain 68 covers the opening. Thus, the latch 20 locks the main panel 616 (specifically, the second bifold panel 616B) in place via the curtain 68, or via the ceiling or floor if a joint such as the joint 30 is used as the latch 20. Using only a simple bifold door in conjunction with the curtain 68 may decrease cost, increase ease of use, and increase ease of retrofitting.

The sixth embodiment is one example of a configuration in which the main panel 616 is rigid, and the lavatory 600 further includes at least one flexible panel, for example, the curtain 68. A flexible panel may simplify the configuration and allow the extendible door 610 to be stowed and deployed in varying arrangements with greater leeway. The second and fourth embodiments are examples of configurations in which the main panel 216, 416 is rigid, and the expandable door 210, 410 further includes at least one additional rigid panel, for example, the bifold doors 246, 460. The rigid panels may provide an increased feeling of privacy and security for the passenger using the lavatory.

As an optional feature, as shown in FIG. 6E, the first wall 12A may include a latchable panel 70 adjacent the sink 66 of the lavatory 600. The latchable panel 70 may be configured to open outward from the lavatory 600 in an unlatched state. The latching may be achieved by a simple vertical slide lock, spring loaded pin, etc. near the doorway 14. The latchable panel 70 may swing about a hinge located at the corner of the lavatory 600. Further, the curtain 68 may be configured to extend across the gap between the main panel 616 and the latchable panel 70. For instance, the curtain may be disposed inside of the latchable panel 70 and pulled out after use of a release mechanism. In any case, providing the latchable panel 70 may not only allow the passenger to have more space to move, particularly when the sink does not extend all of the way to the floor, but may also allow a helper to provide assistance for passengers who are not able to move themselves from the on-board wheelchair 62, etc.

Figure 7:
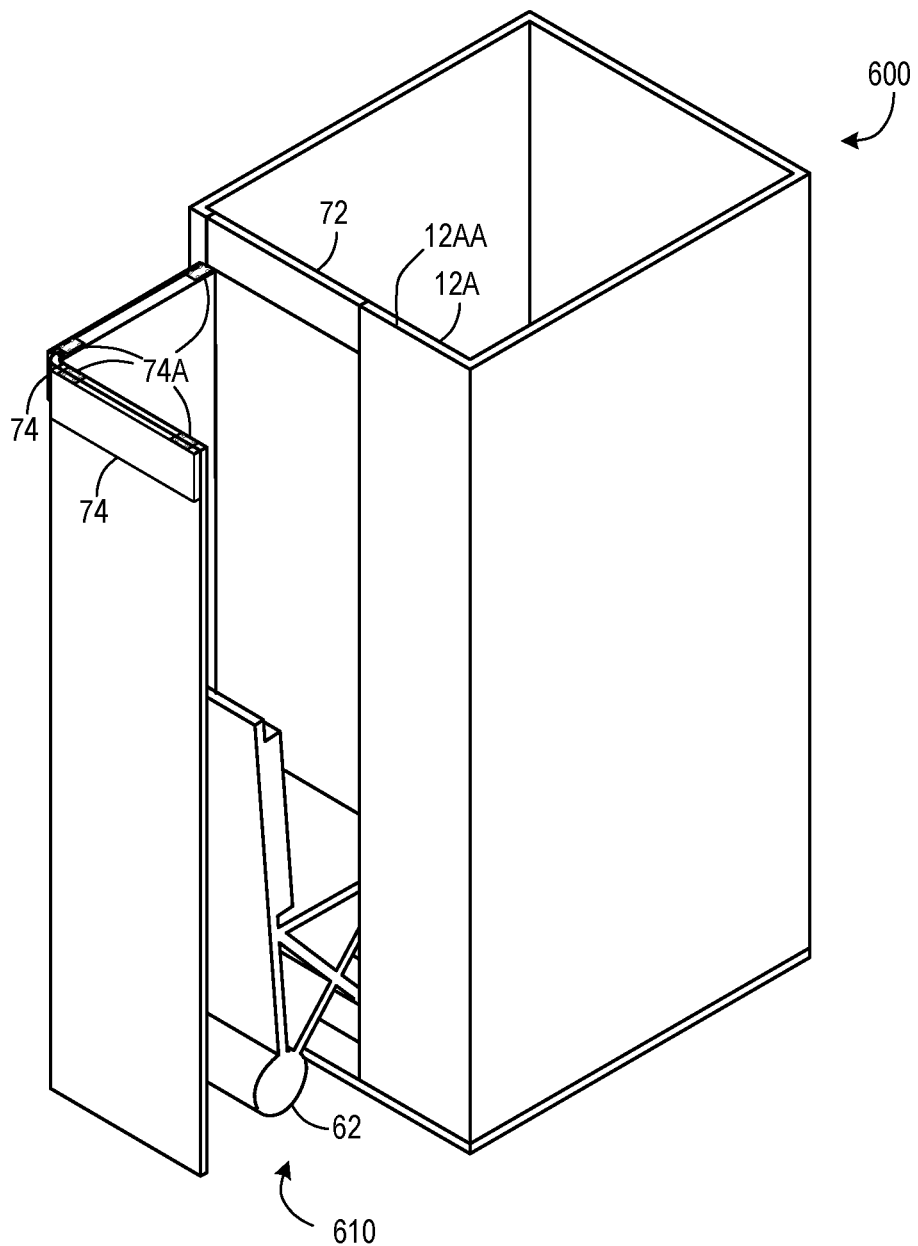
FIG. 7 shows a modification of the expandable door of any embodiment including upper flaps.

To show different examples of typical lavatories, the lavatory 600 is illustrated as including an upper portion 72 of the doorway 14 rather than using the ceiling as the top border of the doorway 14, and thus the expandable door 610 does not reach the ceiling. In contrast, FIG. 5B shows that in the lavatory 500, the doorway 14 extends to a top edge 12AA of the first wall 12A, increasing the opening through which passengers may walk. However, any of the disclosed embodiments may have doorways 14 that do or do not extend to the ceiling. When a gap is present, as shown in FIG. 7, using the sixth embodiment as a base merely for example, one or more flaps 74 may be included to be flipped up and cover the gap in the deployed state. While many features of the above described embodiments relate to increasing the door width of the expandable door 10 (210, 310 . . . ), the flaps 74 may serve to increase a door height. The flaps 74 may be rotatably connected to the main panel 616 via flap hinges 74A, or they may slide out from within whichever panel they are mounted on, for example. The main panel 616 may optionally include a recess (not shown) to accommodate the flaps 74. A mechanism may also be included to lock the flaps in the closed position. Such flaps 74 may increase the passenger's feeling of security and privacy.

The expandable doors of any of the above embodiments may be the original door in a new lavatory. Alternatively, the lavatory of any of the above embodiments may be configured to be retrofitted with the expandable door. Retrofitting with the disclosed expandable doors may save significant costs both in purchase price and installation costs compared to replacing an entire lavatory monument.

Figure 10:
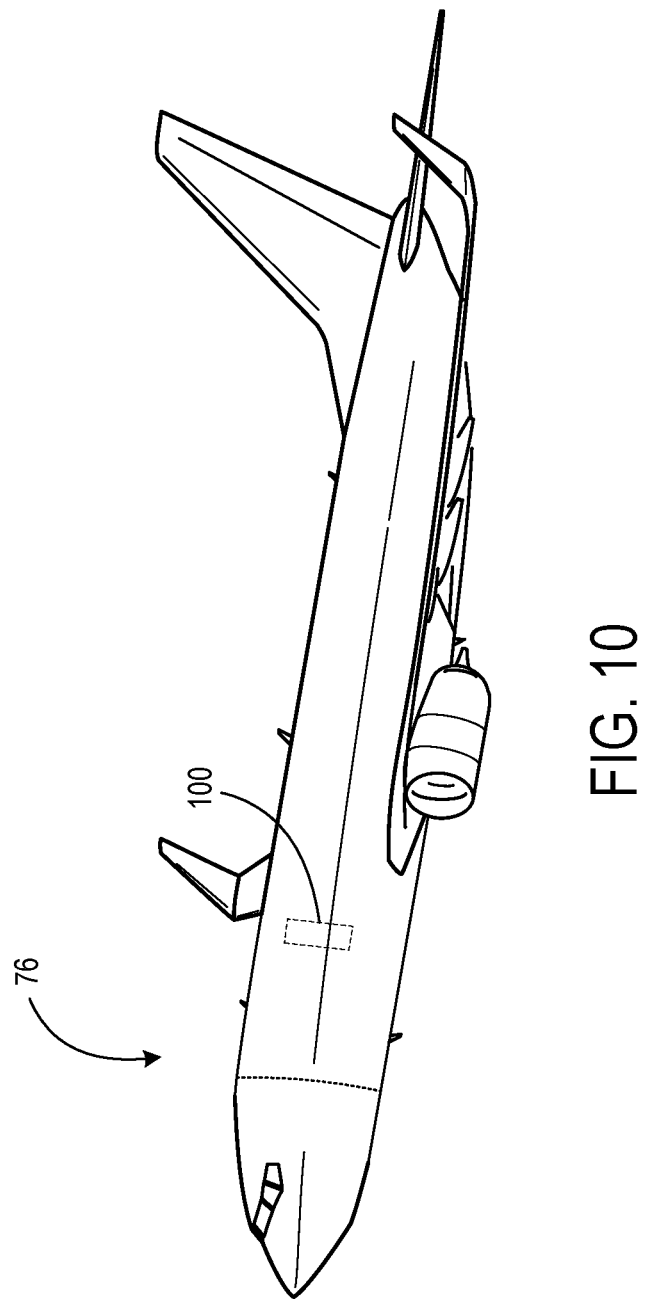
FIG. 10 shows a transportation apparatus equipped with the lavatory and expandable door of any embodiment.

As shown schematically in FIG. 10, the lavatory of any of the above embodiments may be included in a transportation apparatus 76 such as an aircraft, bus, train, submarine, etc. Specifically in the depicted example, the lavatory 100 (200, 300 . . . ) may be an aircraft lavatory. As aircraft are transportation apparatuses in which passengers are held for long periods of time, space is highly valuable, and changing configurations requires precise engineering, the disclosed lavatories and extendible doors provide multiple ways for ensuring that everyone on board is able to visit the lavatory when necessary while minimizing the effect on cost and permanently occupied space. Accordingly, any of the above disclosed expandable doors may be an expandable door 10 (210, 310 . . . ) for retrofitting to an aircraft lavatory 100 (200, 300 . . . ).

Figure 9:
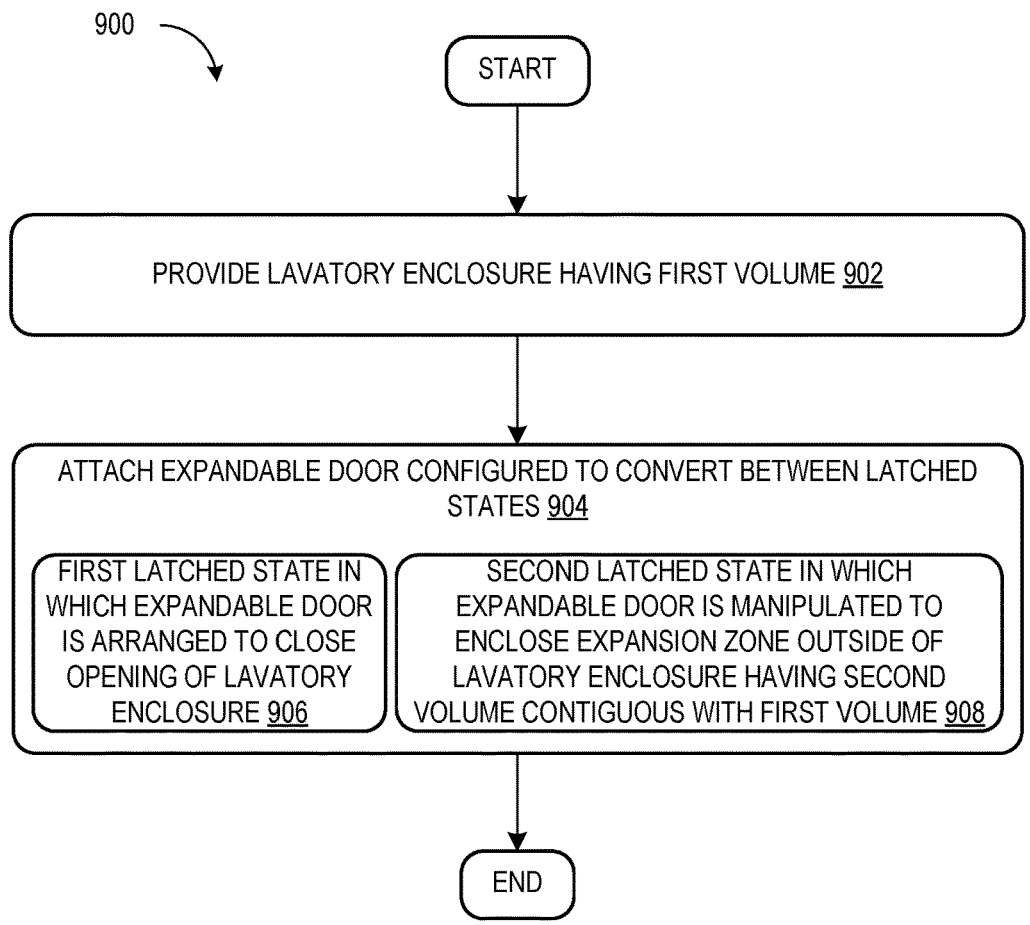
FIG. 9 is a flowchart of a method of manufacturing a lavatory according to the present disclosure.

FIG. 9 is a flowchart of a method 900 of manufacturing a lavatory. The following description of method 900 is provided with reference to the lavatory 100 (200, 300 . . . ) described above and shown in FIGS. 1A-7. It will be appreciated that method 900 may also be performed in other contexts using other suitable components.

With reference to FIG. 9, at 902, the method 900 includes providing a lavatory enclosure having a first volume. The volume may be defined by a plurality of walls, a floor, and a ceiling. At 904, the method 900 includes attaching an expandable door configured to convert between the following latched states: at 906, a first latched state in which the expandable door is arranged to close an opening of the lavatory enclosure, and at 908, a second latched state in which the expandable door is manipulated to enclose an expansion zone outside of the lavatory enclosure having a second volume contiguous with the first volume. In this manner, a lavatory that is expandable between may be manufactured merely the first volume of the lavatory enclosure, and the first volume plus the expansion zone having a second volume, may be manufactured. Accordingly, the lavatory may be converted to a wheelchair accessible lavatory on demand, and then collapsed back to its original size in order to resume the previous use of the expansion zone, e.g., walking space in the aisle.

In the method 900, the expandable door may include a plurality of rigid panels, at least one rigid panel of which is attached to the lavatory enclosure via a hinge. With rigid panels, a passenger using the lavatory in the deployed state may have a secure and private experience. Also in the method 900, as viewed from above, an area of the second volume may be about 10% to about 40% of an area of the first volume, about 15% to about 35%, or about 20% to about 30%. These values provide sufficient space for the passenger to use the lavatory while reducing added weight, reducing lost space, and providing user friendliness with reasonably sized and reasonably numbered panels.

The expandable panels of the door panel may comprise materials typically used in the construction of a lavatory door panel such as plastics, structural foams, composites, metals, and like materials and combinations thereof. The curtain, in embodiments, can comprise a material having the ability to be flexible to extend around the lavatory area, and also, have a hardness and/or stiffness sufficient to allow the curtain to maintain its shape. Materials having such properties and suitable for use as the curtain for the expandable panels include a variety of textiles, plastics, or a combination of both.

On-board wheelchairs have varying dimensions but are typically approximately 14 to 16 inches wide and 20 to 25 inches long. Any of the above disclosed embodiments may be used to provide an expansion zone that is sized to accommodate any of these wheelchair dimensions. It is noted that in some cases, a front portion of the wheelchair may extend into the basic lavatory zone while the wheelchair is accommodated in the expansion zone.

The following paragraphs provide additional support for the claims of the subject application. One aspect provides a lavatory. The lavatory comprises a plurality of walls including a first wall having a doorway, and an expandable door. The expandable door includes a main panel having dimensions that conform to the doorway, and a main hinge connecting the main panel to the first wall. The lavatory includes a latch. The main panel is configured to, in a deployed state, increase in at least one dimension to form a privacy barrier around an expansion zone located outside of the plurality of walls. The latch is configured to lock the expandable door in place in the deployed state. In this aspect, additionally or alternatively, the main panel includes an outer panel having a hollow space inside, and a pocket extension configured to slide out from the hollow space at a side opposite of the main hinge. The pocket extension includes a pair of foldable pocket panels joined by a pocket hinge. The main panel includes a joint that allows the pocket extension to slide within the hollow space and connects to a first pocket panel of the pair of foldable pocket panels to the outer panel in the deployed state. The pair of foldable pocket panels are configured to be stored inside of the outer panel in a folded state, and after sliding out from the hollow space, unfold at the pocket hinge to transition to the deployed state of the expandable door. The latch connects a second pocket panel of the pair of foldable pocket panels to the first wall. In this aspect, additionally or alternatively, the lavatory further comprises a bifold door connected to the first wall at one side of the doorway. The bifold door includes a pair of extendable panels each having an inner panel configured to be stowed inside of an outer panel. A first extendable panel of the pair of extendable panels is connected to the first wall. A second extendable panel of the pair of extendable panels is connected to the first extendable panel at one side thereof, and is configured to connect to an open end of the main panel at an opposite side thereof via the latch. In this aspect, additionally or alternatively, the main panel forms a trifold door together with a first trifold panel and a second trifold panel, the main panel being connected to the first trifold panel via a first hinge at a side of the main panel opposite of the main hinge, and the first trifold panel being connected to the second trifold panel via a second hinge at a side of the first trifold panel opposite of the first hinge. In a stowed state, the second trifold panel is sandwiched between the main panel and the first trifold panel. When transitioning to the deployed state, the trifold door is configured to unfold and the second trifold panel is configured to connect to the first wall at a side of the second trifold panel opposite of the second hinge, via the latch. In this aspect, additionally or alternatively, the main panel is a first bifold door comprising a first bifold panel connected to the first wall via the main hinge and a second bifold panel connected to the first bifold panel via a first bifold hinge, the lavatory further comprises a second bifold door comprising a third bifold panel connected to the first wall at an opposite side of the doorway, and a fourth bifold panel connected to the third bifold panel via a second bifold hinge, and the latch connects the second bifold panel of the first bifold door to the fourth bifold panel of the second bifold door. In this aspect, additionally or alternatively, the main panel includes an outer panel having a hollow space inside, the outer panel being configured to split apart into a first half and a second half arranged side by side, and a pocket extension configured to slide out from the hollow space when the first and second halves of the outer panel are separated from one another. Once the pocket extension slides out from the hollow space, the pocket extension is rotatably coupled to the first and second halves of the outer panel, the first half of the outer panel is connected to the first wall at one side of the doorway via the main hinge, and the second half of the outer panel is configured to latch to the first wall at an opposite side of the doorway. In this aspect, additionally or alternatively, the lavatory further comprises a privacy curtain, the main panel is a bifold door comprising a first bifold panel connected to the first wall via the main hinge and a second bifold panel connected to the first bifold panel via a first bifold hinge, and in the deployed state, the bifold door is opened such that the second bifold panel is separated from the first wall by an opening, and the privacy curtain covers the opening. In this aspect, additionally or alternatively, the main panel is rigid, and the expandable door further includes at least one additional rigid panel. In this aspect, additionally or alternatively, the main panel is rigid, and the lavatory further includes at least one flexible panel. In this aspect, additionally or alternatively, the doorway extends to a top edge of the first wall. In this aspect, additionally or alternatively, the first wall includes a latchable panel adjacent a sink of the lavatory, the latchable panel configured to open outward from the lavatory in an unlatched state. In this aspect, additionally or alternatively, the lavatory is configured to be retrofitted with the expandable door. In this aspect, additionally or alternatively, the expansion zone is sized to accommodate a wheelchair. In this aspect, additionally or alternatively, as viewed from above, the expansion zone has an area of about 10% to about 40% of a lavatory area bounded by the plurality of walls. In this aspect, additionally or alternatively, the lavatory is an aircraft lavatory. In this aspect, additionally or alternatively, the latch is further configured to lock the expandable door in place in a closed state in which the door covers the doorway and the privacy barrier around the expansion zone is not formed. In this aspect, additionally or alternatively, the latch is an auxiliary latch and the lavatory further comprises a main latch configured to lock the expandable door in place in a closed state in which the expandable door covers the doorway and the privacy barrier around the expansion zone is not formed.

Another aspect provides a method of manufacturing a lavatory. The method comprises providing a lavatory enclosure having a first volume, and attaching an expandable door configured to convert between the following latched states: a first latched state in which the expandable door is arranged to close an opening of the lavatory enclosure, and a second latched state in which the expandable door is manipulated to enclose an expansion zone outside of the lavatory enclosure having a second volume contiguous with the first volume. In this aspect, additionally or alternatively, the expandable door includes a plurality of rigid panels, at least one rigid panel of which is attached to the lavatory enclosure via a hinge. In this aspect, additionally or alternatively, as viewed from above, an area of the second volume is about 10% to about 40% of an area of the second volume.

Another aspect provides an expandable door for retrofitting to an aircraft lavatory. The expandable door comprises a main panel, a main hinge connecting the main panel to wall of the aircraft lavatory, and a latch. The main panel is configured to, in a deployed state, increase in at least one dimension to form a privacy barrier around an expansion zone located outside of the plurality of walls, and the latch is configured to lock the expandable door in place in the deployed state. In this aspect, additionally or alternatively, the latch is further configured to lock the expandable door in place in a closed state in which the expandable door covers a doorway of the aircraft lavatory and the privacy barrier around the expansion zone is not formed.

It will be understood that the configurations and/or approaches described herein are exemplary in nature, and that these specific embodiments or examples are not to be considered in a limiting sense, because numerous variations are possible. The specific routines or methods described herein may represent one or more of any number of strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems, and configurations, and other features, functions, acts, and/or properties disclosed herein, as well as any and all equivalents thereof.

The invention claimed is:

1. A lavatory comprising:
   a plurality of walls including a first wall having a doorway;
   an expandable door including:
      a main panel having dimensions that conform to the doorway and is configured to cover the doorway in a closed state; and
      a main hinge connecting the main panel to the first wall; and
   a latch, wherein
   the expandable door is configured to, in a deployed state, increase in at least one dimension from the main panel dimensions in the closed state to form a privacy barrier around an expansion zone located outside of the plurality of walls, and
   the latch is configured to lock the expandable door in place in the deployed state.

2. The lavatory of claim 1, wherein
   the main panel includes:
      an outer panel having a hollow space inside; and
      a pocket extension configured to slide out from the hollow space at a side opposite of the main hinge, the pocket extension including a pair of foldable pocket panels joined by a pocket hinge; and
      a joint that allows the pocket extension to slide within the hollow space and connects to a first pocket panel of the pair of foldable pocket panels to the outer panel in the deployed state,
   the pair of foldable pocket panels are configured to be stored inside of the outer panel in a folded state, and after sliding out from the hollow space, unfold at the pocket hinge to transition to the deployed state of the expandable door, and
   the latch connects a second pocket panel of the pair of foldable pocket panels to the first wall.

3. The lavatory of claim 1, further comprising a bifold door connected to the first wall at one side of the doorway, wherein
   the bifold door includes a pair of extendable panels each having an inner panel configured to be stowed inside of an outer panel,
   a first extendable panel of the pair of extendable panels is connected to the first wall, and
   a second extendable panel of the pair of extendable panels is connected to the first extendable panel at one side thereof, and is configured to connect to an open end of the main panel at an opposite side thereof via the latch to thereby add the bifold door to the expandable door.

4. The lavatory of claim 1, wherein
   the main panel forms a trifold door together with a first trifold panel and a second trifold panel, the main panel being connected to the first trifold panel via a first hinge at a side of the main panel opposite of the main hinge, and the first trifold panel being connected to the second trifold panel via a second hinge at a side of the first trifold panel opposite of the first hinge,
   in a stowed state, the second trifold panel is sandwiched between the main panel and the first trifold panel, and
   when transitioning to the deployed state, the trifold door is configured to unfold and the second trifold panel is configured to connect to the first wall at a side of the second trifold panel opposite of the second hinge, via the latch.

5. The lavatory of claim 1, wherein
   the main panel is a first bifold door comprising a first bifold panel connected to the first wall via the main hinge and a second bifold panel connected to the first bifold panel via a first bifold hinge,
   the lavatory further comprises a second bifold door comprising a third bifold panel connected to the first wall at an opposite side of the doorway, and a fourth bifold panel connected to the third bifold panel via a second bifold hinge, and
   the latch connects the second bifold panel of the first bifold door to the fourth bifold panel of the second bifold door.

6. The lavatory of claim 1, wherein
the main panel includes:
  an outer panel having a hollow space inside, the outer panel being configured to split apart into a first half and a second half arranged side by side; and
  a pocket extension configured to slide out from the hollow space when the first and second halves of the outer panel are separated from one another,
once the pocket extension slides out from the hollow space, the pocket extension is rotatably coupled to the first and second halves of the outer panel,
the first half of the outer panel is connected to the first wall at one side of the doorway via the main hinge, and
the second half of the outer panel is configured to latch to the first wall at an opposite side of the doorway.

7. The lavatory of claim 1, wherein
the lavatory further comprises a privacy curtain,
the main panel is a bifold door comprising a first bifold panel connected to the first wall via the main hinge and a second bifold panel connected to the first bifold panel via a first bifold hinge,
in the deployed state, the bifold door is opened such that the second bifold panel is separated from the first wall by an opening, and the privacy curtain covers the opening.

8. The lavatory of claim 1, wherein
the main panel is rigid, and
the expandable door further includes at least one additional rigid panel.

9. The lavatory of claim 1, wherein
the main panel is rigid, and
the lavatory further includes at least one flexible panel.

10. The lavatory of claim 1, wherein the doorway extends to a top edge of the first wall.

11. The lavatory of claim 1, wherein the first wall includes a latchable panel adjacent to a sink of the lavatory, the latchable panel configured to open outward from the lavatory in an unlatched state.

12. The lavatory of claim 1, wherein the expansion zone is sized to accommodate a wheelchair.

13. The lavatory of claim 1, wherein as viewed from above, the expansion zone has an area of about 10% to about 40% of a lavatory area bounded by the plurality of walls.

14. The lavatory of claim 1, wherein the lavatory is an aircraft lavatory.

15. The lavatory of claim 1, wherein in the closed state, the latch is further configured to lock the expandable door in place with the main panel covering the doorway and the privacy barrier around the expansion zone is not formed.

16. The lavatory of claim 1, wherein
the latch is an auxiliary latch and the lavatory further comprises a main latch, and
in the closed state, the main latch is configured to lock the expandable door in place with the main panel covering the doorway and the privacy barrier around the expansion zone is not formed.

17. A method of manufacturing a lavatory, the method comprising:
  providing a lavatory enclosure having a first volume;
  attaching an expandable door configured to convert between the following latched states:
    a first latched state in which the expandable door is arranged to close a doorway of the lavatory enclosure; and
    a second latched state in which the expandable door is manipulated to enclose an expansion zone in an aisle outside of the lavatory enclosure having a second volume contiguous with the first volume.

18. The method of claim 17, wherein the expandable door includes a plurality of rigid panels, at least one rigid panel of which is attached to the lavatory enclosure via a hinge.

19. The method of claim 17, wherein as viewed from above, an area of the second volume is about 10% to about 40% of an area of the first volume.

20. An expandable door for retrofitting to an aircraft lavatory, the expandable door comprising:
  a main panel;
  a main hinge connecting the main panel to a wall of a plurality of walls of the aircraft lavatory; and
  a latch, wherein
  the expandable door is configured to, in a deployed state, increase in at least one dimension to form a privacy barrier around an expansion zone located outside of the plurality of walls,
  the latch is configured to lock the expandable door in place in the deployed state, and
  the latch is further configured to lock the expandable door in place in a closed state in which the main panel covers a doorway of the aircraft lavatory and the privacy barrier around the expansion zone is not formed.

21. The expandable door of claim 20, wherein the expansion zone is in an aisle of the aircraft.

22. The expandable door of claim 20, wherein the expansion zone is sized to accommodate a wheelchair.

* * * * *